(12) United States Patent
Iwai et al.

(10) Patent No.: US 8,270,707 B2
(45) Date of Patent: Sep. 18, 2012

(54) LEARNING DEVICE, LEARNING METHOD, IDENTIFICATION DEVICE, IDENTIFICATION METHOD, AND PROGRAM

(75) Inventors: Yoshiaki Iwai, Tokyo (JP); Akira Nakamura, Kanagawa (JP); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 270 days.

(21) Appl. No.: 12/704,001

(22) Filed: Feb. 11, 2010

(65) Prior Publication Data

US 2010/0208983 A1 Aug. 19, 2010

(30) Foreign Application Priority Data

Feb. 19, 2009 (JP) ................ P2009-036500

(51) Int. Cl.
*G06K 9/00* (2006.01)
*G06F 15/18* (2006.01)
*G06F 21/00* (2006.01)
(52) U.S. Cl. .................. 382/159; 706/12; 713/186
(58) Field of Classification Search .......... 382/159, 382/164, 171, 173, 177, 179, 190, 199, 115, 382/155, 157, 192; 702/190; 704/221, 243, 704/247; 705/7.33, 44, 67; 706/12, 25; 713/155, 713/161, 168, 170, 176, 186
See application file for complete search history.

(56) References Cited

U.S. PATENT DOCUMENTS

| | | | | |
|---|---|---|---|---|
| 5,182,777 A * | 1/1993 | Nakayama et al. | ........... | 382/170 |
| 6,393,151 B1 * | 5/2002 | Yamamoto et al. | ........... | 382/200 |
| 7,679,621 B2 * | 3/2010 | Nishiyama et al. | ........... | 345/611 |
| 7,801,354 B2 * | 9/2010 | Yokono | ........... | 382/159 |
| 8,108,408 B2 * | 1/2012 | Kondo et al. | ........... | 707/749 |

FOREIGN PATENT DOCUMENTS

| | | |
|---|---|---|
| JP | 2006-338082 | 12/2006 |
| JP | 2007-128195 | 5/2007 |

OTHER PUBLICATIONS

P. Viola et al., "Robust Real-Time Face Detection," International Journal of Computer Vision, vol. 57, No. 2, pp. 137-154 (2004).
G. Csurka et al., Visual Categorization with Bags of Keypoints, ECCV International Workshop on Statistical Learning in Computer Vision, Prague (2004).
D. Lowe, "Object Recognition from Local Scale-Invariant Features," Proceedings of the International Conference on Computer Vision, Corfu (Sep. 1999).
J. Yokono et al., "Oriented Filters for Object Recognition: An Empirical Study," Sixth IEEE International Conference on Automatic Face and Gesture Recognition 2004 Proceedings (2004).

* cited by examiner

*Primary Examiner* — Abolfazl Tabatabai
(74) *Attorney, Agent, or Firm* — Finnegan, Henderson, Farabow, Garrett & Dunner, L.L.P.

(57) ABSTRACT

A learning device includes a feature-point extracting section extracting feature points from a generation image, a feature-point feature-quantity extracting section extracting feature-point feature-quantities representing features of the feature points, a total-feature-quantity generating section generating a total feature quantity represented by a multi-dimensional vector, and an identifier generating section generating an identifier using the total feature quantity and a true label indicating whether or not the generation image is a positive image or a negative image.

15 Claims, 15 Drawing Sheets

$G_1^{0°}$  $G_1^{90°}$  $G_1^{45°}$ $G_2^{0°}$  $G_2^{60°}$  $G_2^{120°}$ $G_3^{0°}$  $G_3^{45°}$  $G_3^{90°}$  $G_3^{135°}$

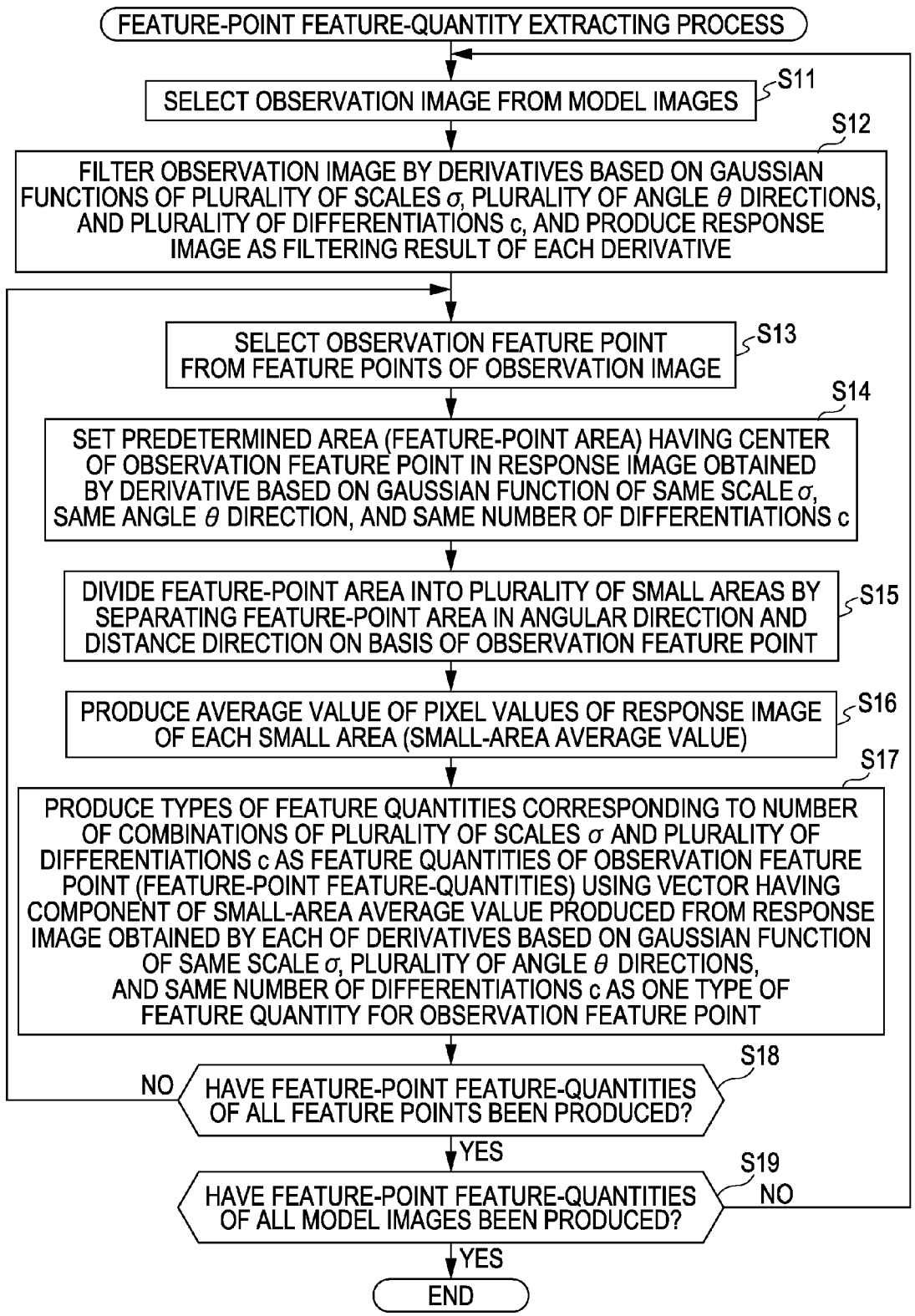

LEARNING DEVICE, LEARNING METHOD, IDENTIFICATION DEVICE, IDENTIFICATION METHOD, AND PROGRAM

BACKGROUND OF THE INVENTION

1. Field of the Invention

The present invention relates to a learning device, a learning method, an identification device, an identification method, and a program, and more particularly to a learning device, a learning method, an identification device, an identification method, and a program which can improve both discrimination and invariance in the identification of whether or not a subject viewed in an image is a predetermined identification object.

2. Description of the Related Art

A method of performing matching using a template where identification objects are broadly described exists as a method of identifying an object as an identification object located within an image from the image captured by a camera.

That is, the identification method in the related art prepares a template where identification objects are broadly described, that is, a template of textures of all identification objects, and matches an image of an object to be identified (an object to be processed) with the template.

However, it is difficult to process a hidden or distorted part of the identification object viewed in an image as an object to be processed in a matching process using the template where identification objects are broadly described.

There is a method of observing a local area of an image to be processed, extracting feature quantities from each local area, and performing an identification process by employing a combination of the feature quantities of the local area (a set of the feature quantities of the local area), that is, a vector using the feature quantities of each local area as components.

When a set of feature quantities of a local area is used, a high-precision identification process may be performed by partially solving the problem of a hidden or distorted part of an identification object which is difficult to be processed in the method using a template where identification objects are broadly described.

A feature quantity of a local area is used for object category identification as well as individual object identification. For example, a method of identifying a specific category such as the face of a person or the like using a feature quantity of a local area has been proposed (for example, see P. Viola and M. Jones, "Robust Real-time Face Detection", cvpr 2001).

Various frameworks for category identification have been proposed. For example, there is a framework using a histogram of BoF (Bag of Features) (for example, see G. Csurka, C. Bray, C. Dance, and L. Fan, "Visual Categorization with Bags of Keypoints", ECCV 2004), a framework using a correlation of feature quantities (for example, see Japanese Unexamined Patent Application Publication No. 2007-128195), or the like as a framework proposed for the category identification.

For example, an SIFT feature quantity (for example, see D. Lowe, "Object Recognition from Local Scale-Invariant Features", ICCV 1999) or an output (response) of a steerable filter (for example, see J. J. Yokono and T. Poggio, "Oriented Filters for Object Recognition: an empirical study", FG 2004) have been proposed as a feature quantity of a local area for use in identification.

SUMMARY OF THE INVENTION

The discrimination for identifying (discriminating) an identification object and others and the invariance for identifying the motion of an object to be identified even when the identification object is rotated or distorted are necessary for identifying an individual object or an object category.

However, the discrimination and invariance are generally in a trade-off relationship. Therefore, it is difficult to improve both the discrimination and the invariance even when an SIFT feature quantity or a response of a steerable filter is used as a feature quantity for the identification of whether or not a subject viewed in an image is a predetermined identification object such as the identification of an individual object or an object category.

It is desirable to improve both discrimination and invariance in the identification of whether or not a subject viewed in an image is a predetermined identification object.

According to a first embodiment of the present invention, a learning device, or a program for making a computer function as a learning device, includes feature-point extracting means for extracting feature points as characteristic points from one of a plurality of generation images including a positive image in which a predetermined identification object is viewed and a negative image in which no identification object is viewed for use in learning to generate an identifier for identifying whether or not a subject viewed in an image is the identification object, feature-point feature-quantity extracting means for extracting feature-point feature-quantities representing features of the feature points of the generation image, total-feature-quantity generating means for generating a total feature quantity represented by a multi-dimensional vector from the feature-point feature-quantities of the generation image, wherein the total feature quantity represents a feature of the entire generation image, and identifier generating means for generating the identifier using the total feature quantity of the generation image and a true label indicating whether or not the generation image is a positive image or a negative image, wherein the feature-point feature-quantity extracting means divides a feature-point area into a plurality of small areas by separating the feature-point area as an area having a feature point as a center in an angular direction and a distance direction on the basis of the feature point in each of a plurality of response images obtained by filtering the generation image by a plurality of filters having different characteristics, produces a statistical quantity of pixel values of a small area for each of the plurality of small areas, and sets the statistical quantity of each of the plurality of small areas obtained from each of the plurality of response images for the feature point as a feature-point feature-quantity of the feature point, and wherein the identifier generating means generates the identifier for performing identification using a dimensional feature quantity to decrease an error value representing an identification error level of the positive and negative images among a plurality of dimensional feature quantities which are components of the multi-dimensional vector as the total feature quantity, and generates dimensional information representing a dimension of the dimensional feature quantity to decrease the error value.

According to the first embodiment of the present invention, a learning method includes the steps of extracting feature points as characteristic points from one of a plurality of generation images including a positive image in which a predetermined identification object is viewed and a negative image in which no identification object is viewed for use in learning to generate an identifier for identifying whether or not a subject viewed in an image is the identification object, extracting feature-point feature-quantities representing features of the feature points of the generation image, generating a total feature quantity represented by a multi-dimensional vector from the feature-point feature-quantities of the generation image, wherein the total feature quantity represents a feature of the entire generation image, and generating the identifier using the total feature quantity of the generation image and a true label indicating whether or not the generation image is a positive image or a negative image, wherein the extracting step is performed by dividing a feature-point area into a plurality of small areas by separating the feature-point area as an area having a feature point as a center in an angular direction and a distance direction on the basis of the feature point in each of a plurality of response images obtained by filtering the generation image by a plurality of filters having different characteristics, producing a statistical quantity of pixel values of a small area for each of the plurality of small areas, and setting the statistical quantity of each of the plurality of small areas obtained from each of the plurality of response images for the feature point as a feature-point feature-quantity of the feature point, and wherein the generating step is performed by generating the identifier for performing identification using a dimensional feature quantity to decrease an error value representing an identification error level of the positive and negative images among a plurality of dimensional feature quantities which are components of the multi-dimensional vector as the total feature quantity, and generating dimensional information representing a dimension of the dimensional feature quantity to decrease the error value.

In the first embodiment of the present invention, feature points as characteristic points are extracted from one of a plurality of generation images including a positive image in which a predetermined identification object is viewed and a negative image in which no identification object is viewed for use in learning to generate an identifier for identifying whether or not a subject viewed in an image is the identification object. Feature-point feature-quantities representing features of the feature points of the generation image are extracted. A total feature quantity represented by a multi-dimensional vector is generated from the feature-point feature-quantities of the generation image, wherein the total feature quantity represents a feature of the entire generation image. The identifier is generated using the total feature quantity of the generation image and a true label indicating whether or not the generation image is a positive image or a negative image. In this case, a feature-point area is divided into a plurality of small areas by separating the feature-point area as an area having a feature point as a center in an angular direction and a distance direction on the basis of the feature point in each of a plurality of response images obtained by filtering the generation image by a plurality of filters having different characteristics. A statistical quantity of pixel values of a small area is produced for each of the plurality of small areas. The statistical quantity of each of the plurality of small areas obtained from each of the plurality of response images for the feature point is set as a feature-point feature-quantity of the feature point. The identifier for performing identification is generated using a dimensional feature quantity to decrease an error value representing an identification error level of the positive and negative images among a plurality of dimensional feature quantities which are components of the multi-dimensional vector as the total feature quantity. Dimensional information representing a dimension of the dimensional feature quantity to decrease the error value is generated.

According to a second embodiment of the present invention, an identification device, or a program for making a computer function as an identification device, includes feature-point extracting means for extracting feature points as characteristic points from a processing object image of an object used to identify whether or not a subject viewed in the image is a predetermined identification object, feature-point feature-quantity extracting means for extracting feature-point feature-quantities representing features of the feature points, dimensional-feature-quantity generating means for generating a dimensional feature quantity of a dimension represented by dimensional information among a plurality of dimensional feature quantities which are components of a vector as a total feature quantity represented by a multi-dimensional vector from the feature-point feature-quantities of the processing object image, wherein the total feature quantity represents a feature of the entire processing object image, and identification means for identifying whether or not the subject viewed in the processing object image is the predetermined identification object by inputting the dimensional feature quantity to an identifier for identifying whether or not the subject viewed in the processing object image is the predetermined identification object, wherein the feature-point feature-quantity extracting means divides a feature-point area into a plurality of small areas by separating the feature-point area as an area having a feature point as a center in an angular direction and a distance direction on the basis of the feature point in each of a plurality of response images obtained by filtering the processing object image by a plurality of filters having different characteristics, produces a statistical quantity of pixel values of a small area for each of the plurality of small areas, and sets the statistical quantity of each of the plurality of small areas obtained from each of the plurality of response images of the processing object image for the feature point as a feature-point feature-quantity of the feature point, wherein the identifier and dimensional information are obtained by extracting feature points from one of a plurality of generation images including a positive image in which a predetermined identification object is viewed and a negative image in which no identification object is viewed for use in learning to generate the identifier, extracting feature-point feature-quantities representing features of the feature points of the generation image, generating a total feature quantity of the generation image from the feature-point feature-quantities of the generation image, and generating the identifier using the total feature quantity of the generation image and a true label indicating whether or not the generation image is a positive image or a negative image, wherein the extracting is performed by dividing a feature-point area into a plurality of small areas by separating the feature-point area as an area having a feature point as a center in an angular direction and a distance direction on the basis of the feature point in each of a plurality of response images obtained by filtering the generation image by the plurality of filters, producing a statistical quantity of pixel values of a small area for each of the plurality of small areas, and setting the statistical quantity of each of the plurality of small areas obtained from each of the plurality of response images for the feature point as a feature-point feature-quantity of the feature point, and wherein the generating is performed by generating the identifier for performing identification using a dimensional feature quantity to decrease an error value representing an identification error level of the positive and negative images among a plurality of dimensional feature quantities which are components of the multi-dimensional vector as the total feature quantity, and generating dimensional information representing a dimension of the dimensional feature quantity to decrease the error value.

According to the second embodiment of the present invention, an identification method includes the steps of extracting feature points as characteristic points from a processing object image of an object used to identify whether or not a subject viewed in the image is a predetermined identification object, extracting feature-point feature-quantities representing features of the feature points, generating a dimensional feature quantity of a dimension represented by dimensional information among a plurality of dimensional feature quantities which are components of a vector as a total feature quantity represented by a multi-dimensional vector from the feature-point feature-quantities of the processing object image, wherein the total feature quantity represents a feature of the entire processing object image, and identifying whether or not the subject viewed in the processing object image is the predetermined identification object by inputting the dimensional feature quantity to an identifier for identifying whether or not the subject viewed in the processing object image is the predetermined identification object, wherein the feature-point feature-quantity extracting step includes dividing a feature-point area into a plurality of small areas by separating the feature-point area as an area having a feature point as a center in an angular direction and a distance direction on the basis of the feature point in each of a plurality of response images obtained by filtering the processing object image by a plurality of filters having different characteristics, producing a statistical quantity of pixel values of a small area for each of the plurality of small areas, and setting the statistical quantity of each of the plurality of small areas obtained from each of the plurality of response images of the processing object image for the feature point as a feature-point feature-quantity of the feature point, wherein the identifier and dimensional information are obtained by extracting feature points from one of a plurality of generation images including a positive image in which a predetermined identification object is viewed and a negative image in which no identification object is viewed for use in learning to generate the identifier, extracting feature-point feature-quantities representing features of the feature points of the generation image, generating a total feature quantity of the generation image from the feature-point feature-quantities of the generation image, and generating the identifier using the total feature quantity of the generation image and a true label indicating whether or not the generation image is a positive image or a negative image, wherein the extracting is performed by dividing a feature-point area into a plurality of small areas by separating the feature-point area as an area having a feature point as a center in an angular direction and a distance direction on the basis of the feature point in each of a plurality of response images obtained by filtering the generation image by the plurality of filters, producing a statistical quantity of pixel values of a small area for each of the plurality of small areas, and setting the statistical quantity of each of the plurality of small areas obtained from each of the plurality of response images for the feature point as a feature-point feature-quantity of the feature point, and wherein the generating is performed by generating the identifier for performing identification using a dimensional feature quantity to decrease an error value representing an identification error level of the positive and negative images among a plurality of dimensional feature quantities which are components of the multi-dimensional vector as the total feature quantity, and generating dimensional information representing a dimension of the dimensional feature quantity to decrease the error value.

In the second embodiment of the present invention, feature points as characteristic points are extracted from a processing object image of an object used to identify whether or not a subject viewed in the image is a predetermined identification object. Feature-point feature-quantities representing features of the feature points are extracted. A dimensional feature quantity of a dimension represented by dimensional information is generated among a plurality of dimensional feature quantities which are components of a vector as a total feature quantity represented by a multi-dimensional vector from the feature-point feature-quantities of the processing object image, wherein the total feature quantity represents a feature of the entire processing object image. It is identified whether or not the subject viewed in the processing object image is the predetermined identification object by inputting the dimensional feature quantity to an identifier for identifying whether or not the subject viewed in the processing object image is the predetermined identification object. In this case, a feature-point area is divided into a plurality of small areas by separating the feature-point area as an area having a feature point as a center in an angular direction and a distance direction on the basis of the feature point in each of a plurality of response images obtained by filtering the processing object image by a plurality of filters having different characteristics. A statistical quantity of pixel values of a small area is produced for each of the plurality of small areas. The statistical quantity of each of the plurality of small areas obtained from each of the plurality of response images of the processing object image for the feature point is produced as a feature-point feature-quantity of the feature point. The identifier and dimensional information are obtained by extracting feature points from one of a plurality of generation images including a positive image in which a predetermined identification object is viewed and a negative image in which no identification object is viewed for use in learning to generate the identifier, extracting feature-point feature-quantities representing features of the feature points of the generation image, generating a total feature quantity of the generation image from the feature-point feature-quantities of the generation image, and generating the identifier using the total feature quantity of the generation image and a true label indicating whether or not the generation image is a positive image or a negative image, wherein the extracting is performed by dividing a feature-point area into a plurality of small areas by separating the feature-point area as an area having a feature point as a center in an angular direction and a distance direction on the basis of the feature point in each of a plurality of response images obtained by filtering the generation image by the plurality of filters, producing a statistical quantity of pixel values of a small area for each of the plurality of small areas, and setting the statistical quantity of each of the plurality of small areas obtained from each of the plurality of response images for the feature point as a feature-point feature-quantity of the feature point, and wherein the generating is performed by generating the identifier for performing identification using a dimensional feature quantity to decrease an error value representing an identification error level of the positive and negative images among a plurality of dimensional feature quantities which are components of the multi-dimensional vector as the total feature quantity, and generating dimensional information representing a dimension of the dimensional feature quantity to decrease the error value.

Each of the learning device and the identification device can be an independent device, or can be an internal block constituting one device.

The program can be provided by transmitting the program via a transmission medium or recording the program on a recording medium.

According to the first and second embodiments of the present invention, both discrimination and invariance can be improved in the identification of whether or not a subject viewed in an image is a predetermined identification object.

BRIEF DESCRIPTION OF THE DRAWINGS

FIG. 9 is a flowchart illustrating a feature-point feature-quantity extracting process;

DESCRIPTION OF THE PREFERRED EMBODIMENTS

Configuration Example of Learning Device According to Embodiment

Figure 1:
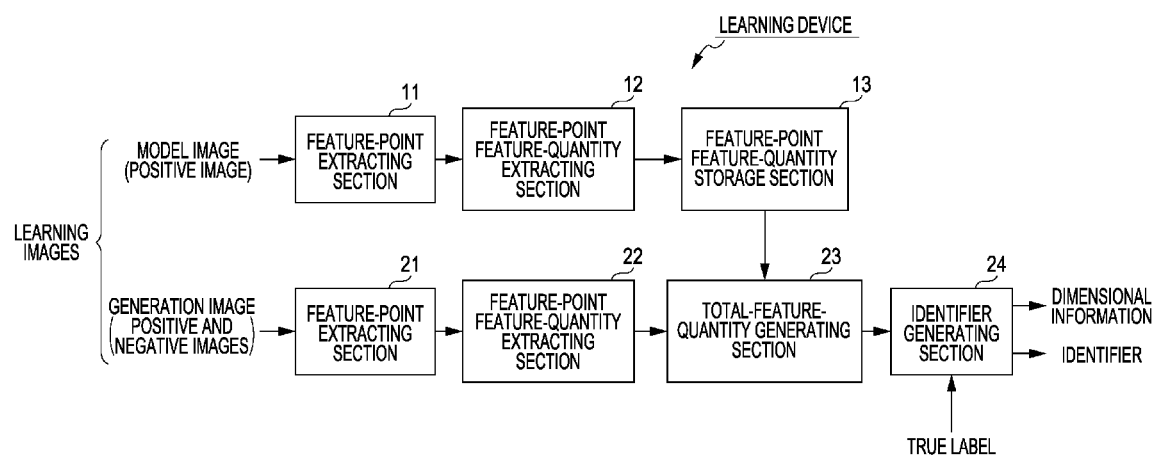
FIG. 1 is a block diagram illustrating a configuration example of a learning device according to an embodiment of the present invention.

FIG. 1 is a block diagram illustrating a configuration example of a learning device according to an embodiment of the present invention.

In FIG. 1, the learning device generates (produces) an identifier for identifying whether or not a subject viewed in an image is a predetermined identification object and dimensional information to be described later using learning images and true labels.

Here, the learning images are images used for generating (learning) an identifier, and include a plurality of model images and a plurality of generation images.

The model image is a positive image in which an identification object is viewed, and the generation image includes both a positive image and a negative image in which no identification object is viewed (an object other than the identification object is viewed).

The true label exists for every generation image, and is a label indicating whether each generation image is the positive or negative image.

In FIG. 1, the learning device includes a feature-point extracting section 11, a feature-point feature-quantity extracting section 12, a feature-point feature-quantity storage section 13, a feature-point extracting section 21, a feature-point feature-quantity extracting section 22, a total-feature-quantity generating section 23, and an identifier generating section 24.

A model image of the learning images is supplied from the outside to the feature-point extracting section 11. The feature-point extracting section 11 extracts feature points as characteristic points from the model image supplied thereto, and supplies the feature-point feature-quantity extracting section 12 with the extracted feature points and the model image.

Here, the feature-point extracting section 11 extracts (a pixel at) a corner point as the feature point since local information of the image is usually included at the corner point.

The corner point can be extracted using a Harris corner detector. When a pixel value of a pixel (for example, luminance) at a certain position (x,y) is denoted by I(x,y) in the Harris corner detector, a pixel in which two unique values of the second-order moment L of the luminance gradient produced by Expression (1) are equal to or greater than a threshold value that is detected as the corner point.

$$L = \begin{bmatrix} \left(\frac{\partial I}{\partial x}\right)^2 & \left(\frac{\partial I}{\partial x}\right)\left(\frac{\partial I}{\partial y}\right) \\ \left(\frac{\partial I}{\partial x}\right)\left(\frac{\partial I}{\partial y}\right) & \left(\frac{\partial I}{\partial y}\right)^2 \end{bmatrix} \quad \text{Expression 1}$$

In Expression (1), a pixel value I(x,y) is expressed as I by omitting (x,y).

In addition, for example, it is possible to adopt a pixel at an edge, a pixel at a predetermined fixed position, or the like as the feature point.

The feature-point feature-quantity extracting section 12 extracts a feature-point feature-quantity representing a feature of the same feature point from the model image supplied by the feature-point extracting section 11, and supplies the feature-point feature-quantity storage section 13 with the extracted feature-point feature-quantity.

The feature-point feature-quantity storage section 13 stores the feature-point feature-quantity of the model image from the feature-point feature-quantity extracting section 12.

A generation image of the learning images is supplied from the outside to the feature-point extracting section 21. Like the feature-point extracting section 11, the feature-point extracting section 21 extracts feature points from the supplied generation image, and supplies the feature-point feature-quantity extracting section 22 with the extracted feature points and the generation image.

Like the feature-point feature-quantity extracting section 12, the feature-point feature-quantity extracting section 22 extracts a feature-point feature-quantity representing a feature of the same feature point from the generation image supplied by the feature-point extracting section 21, and supplies the total-feature-quantity generating section 23 with the extracted feature-point feature-quantity.

The total-feature-quantity generating section 23 produces a total feature quantity indicating a feature of the entire generation image from feature-point feature-quantities of the generation image supplied by the feature-point feature-quantity extracting section 22 on the basis of feature-point feature-quantities of the model image stored in the feature-point feature-quantity storage section 13.

Here, for example, the total feature quantity is expressed by a multi-dimensional vector (a vector having a plurality of values as components). The total feature quantity as the multi-dimensional vector is supplied from the total-feature-quantity generating section 23 to the identifier generating section 24.

Not only the total feature quantity of the generation image is supplied from the total-feature-quantity generating section 23 to the identifier generating section 24, but also a true label of the generation image is supplied from the outside to the identifier generating section 24. The identifier generating section 24 generates an identifier using the total feature quantity of the generation image and the true label of the generation image (performs learning to produce a parameter defining the identifier).

Here, when the components of the multi-dimensional vector as the total feature quantity are assumed to be dimensional feature quantities, the total feature quantity includes a plurality of dimensional feature quantities (whose number corresponds to that of vector dimensions).

The identifier generating section 24 generates an identifier for an identification process using partial dimensional feature quantities selected from among dimensional feature quantities constituting the total feature quantity without employing all the dimensional feature quantities constituting the total feature quantity. Information indicating a dimension of a dimensional feature quantity to be used for identification by the identifier (information indicating a sequence number of a component of the vector as the total feature quantity) is dimensional information, and the identifier generating section 24 also generates the dimensional information along with the identifier.

Configuration Example of Feature-Point
Feature-Quantity Extracting Section 12

Figure 2:
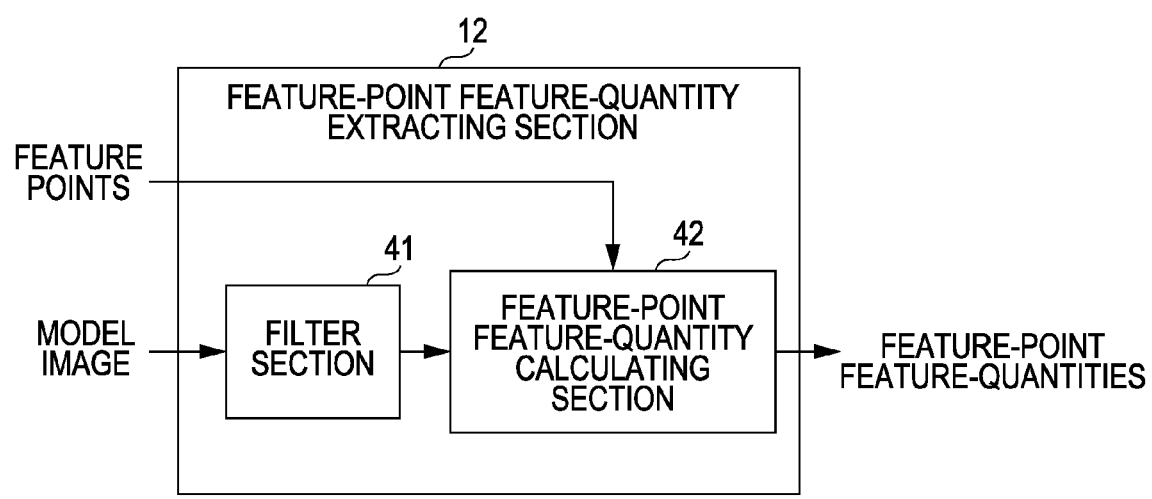
FIG. 2 is a block diagram illustrating a configuration example of a feature-point feature-quantity extracting section.

FIG. 2 is a block diagram illustrating a configuration example of the feature-point feature-quantity extracting section 12 of FIG. 1.

The feature-point feature-quantity extracting section 22 of FIG. 1 and a feature-point feature-quantity extracting section 72 of an identification device (FIG. 16) also have the same configuration as the feature-point feature-quantity extracting section 12. In this regard, the feature-point feature-quantity extracting section 12 processes a model image as an object, but the feature-point feature-quantity extracting section 22 processes a generation image as an object and the feature-point feature-quantity extracting section 72 processes a processing object image as an object.

In FIG. 2, the feature-point feature-quantity extracting section 12 includes a filter section 41 and a feature-point feature-quantity calculating section 42.

An object image from which a feature-point feature-quantity is extracted, that is, a model image here, is supplied from the feature-point feature-quantity extracting section 11 (FIG. 1) to the filter section 41.

The filter section 41 filters the model image from the feature-point extracting section 11 using a plurality of filters having different characteristics, and supplies the feature-point feature-quantity calculating section 42 with a plurality of response images (filtering results) obtained as results of filtering.

The feature points of the model image from the feature-point extracting section 11 (FIG. 1) as well as the response images of the model image from the filter section 41 are supplied to the feature-point feature-quantity calculating section 42.

The feature-point feature-quantity calculating section 42 sets a feature-point area as an area having the center of the feature point from the feature-point extracting section 11 for each of the plurality of response images of the model image from the filter section 41. The feature-point feature-quantity calculating section 42 divides the feature-point area into a plurality of small areas by separating the feature-point area in an angular direction and a distance direction on the basis of the feature point.

The feature-point feature-quantity calculating section 42 produces a statistical quantity of pixel values (pixel values of a small area) for each of the plurality of small areas, and outputs a statistical quantity of each of the plurality of small areas obtained from each of the plurality of response images for each feature point as a feature-point feature-quantity of the feature point.

Filtering of the filter section 41 of FIG. 2 will be described with reference to FIGS. 3 to 6.

For example, the filter section 41 produces a response of a steerable filter disclosed in J. J. Yokono and T. Poggio, "Oriented Filters for Object Recognition: an empirical study", FG 2004 as a response image by filtering the model image from the feature-point extracting section 11.

That is, for example, the filter section 41 filters the model image from the feature-point extracting section 11 by each of a plurality of derivatives based on Gaussian functions of a plurality of scales σ, a plurality of angle θ directions, and a plurality of differentiations c as a plurality of filters having different characteristics, and outputs a plurality of response images of the model image.

Specifically, a two-dimensional Gaussian function $G(x,y)$ is expressed by Expression (2) using a scale (standard deviation) σ.

$$G(x, y) = e^{-\frac{x^2+y^2}{2\sigma^2}} \qquad \text{Expression 2}$$

A derivative based on a Gaussian function $G(x,y)$, an angle θ [degree] direction, and c differentiations (a derivative obtained by performing the c differentiations of the Gaussian function $G(x,y)$) (hereinafter, also referred to as a "$c^{th}$-order derivative") is expressed by $G_c^\theta$.

Since a first-order derivative $G_1^{0°}$ of the 0 degree direction of the Gaussian function $G(x,y)$ matches a result of the (partial) differentiation of the x direction of the Gaussian function $G(x,y)$, the first-order derivative $G_1^{0°}$ can be expressed by Expression (3).

$$G_1^{0°} = \frac{\partial}{\partial x} e^{-\frac{x^2+y^2}{2\sigma^2}} = -\frac{x}{\sigma^2} e^{-\frac{x^2+y^2}{2\sigma^2}} \qquad \text{Expression 3}$$

Since a first-order derivative $G_1^{90°}$ of the 90 degree direction of the Gaussian function $G(x,y)$ matches a result of the differentiation of the y direction of the Gaussian function $G(x,y)$, the first-order derivative $G_1^{90°}$ can be expressed by Expression (4).

$$G_1^{90°} = \frac{\partial}{\partial y} e^{-\frac{x^2+y^2}{2\sigma^2}} = -\frac{y}{\sigma^2} e^{-\frac{x^2+y^2}{2\sigma^2}} \qquad \text{Expression 4}$$

The first-order derivative $G_1^{0°}$ of Expression (3) and the first-order derivative $G_1^{90°}$ of Expression (4) are basis functions of a first-order derivative $G_1^\theta$ of an arbitrary angle θ direction of the Gaussian function $G(x,y)$. Therefore, the first-order derivative $G_1^\theta$ of the arbitrary angle θ direction of the Gaussian function $G(x,y)$ can be expressed by Expression (5) as a linear combination of the first-order derivatives $G_1^{0°}$ and $G_1^{90°}$ which are the basis functions.

$$G_1^\theta = \cos(\theta)G_1^{0°} + \sin(\theta)G_1^{90°} \qquad \text{Expression 5}$$

From Expression (5), for example, a first-order derivative $G_1^{45°}$ of the 45 degree direction of the Gaussian function G(x,y) is expressed by expression (6).

$$G_1^{45°} = \cos(45°)G_1^{0°} + \sin(45°)G_1^{90°} \qquad \text{Expression 6}$$

Figure 3:
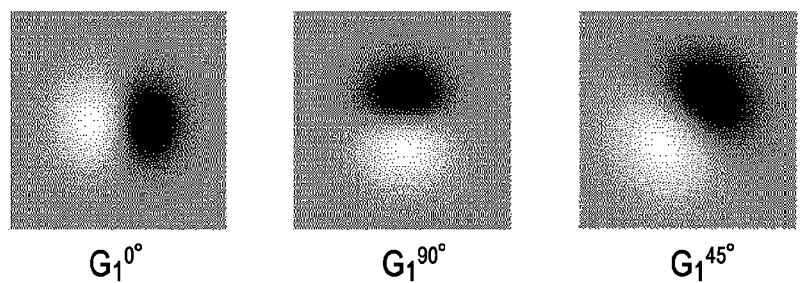
FIG. 3 is a diagram illustrating the derivatives of a Gaussian function.

Here, FIG. 3 illustrates the first-order derivatives $G_1^{0°}$ and $G_1^{90°}$ as the basis functions, and the first-order derivative $G_1^{45°}$ of the 45 degree direction.

In FIG. 3 (like FIGS. 4 and 5 to be described later), the x direction is the transverse direction and the y direction is the longitudinal direction. The lighter (or darker) the color, the larger (or smaller) the value.

The first-order derivative $G_1^{90°}$ as the basis function is obtained by rotating the first-order derivative $G_1^{0°}$ as the basis function by 90 degrees (in a counterclockwise rotation) with respect to the origin. Likewise, the first-order derivative $G_1^{45°}$ is obtained by rotating the first-order derivative $G_1^{0°}$ by 45 degrees.

For example, the filter section 41 produces 8 response images by filtering the model image in each of first-order derivatives $G_1^\theta$ based on Gaussian functions G(x,y) of two scales σ=1 and 2, four angle $\theta=\theta_A, \theta_B, \theta_C$, and $\theta_D$ directions and the number of differentiations c=1.

Here, since the filtering of the model image by the first-order derivative $G_1^\theta$ is expressed by the convolution of the first-order derivative $G_1^\theta$ and the model image, it can be expressed by a linear combination of convolution results of the first-order derivatives $G_1^{0°}$ and $G_1^{90°}$ as the basis functions and the model image from Expression (5).

When a pixel value of the model image is expressed by I, a convolution result $R_1^{0°}$ of the first-order derivative $G_1^{0°}$ and the model image I is expressed by Expression (7) and a convolution result $R_1^{90°}$ of the first-order derivative $G_1^{90°}$ and the model image I is expressed by Expression (8).

$$R_1^{0°} = G_1^{0°} * I \qquad \text{Expression 7}$$

$$R_1^{90°} = G_1^{90°} * I \qquad \text{Expression 8}$$

Here, * represents the convolution.

The response image $R_1^\theta$ obtained by filtering the model image I in the first-order derivative $G_1^\theta$ is expressed by Expression (9) using the convolution result $R_1^{0°}$ of Expression (7) and the convolution result $R_1^{90°}$ of Expression (8).

$$R_1^\theta = \cos(\theta)R_1^{0°} + \sin(\theta)R_1^{90°} \qquad \text{Expression 9}$$

The filter section 41 performs a filtering process for each of a second-order derivative $G_2^\theta$ of the number of differentiations c=2 and a third-order derivative $G_3^\theta$ of the number of differentiations c=3 as in the first-order derivative $G_1^\theta$ of the number of differentiations c=1. The filter section 41 produces 8 response images from the second-order derivative $G_2^\theta$ and produces 8 response images from the third-order derivative $G_3^\theta$.

Here, the second-order derivative $G_2^\theta$ can be expressed by Expression (10) using three second-order derivatives $G_2^{0°}$, $G_2^{60°}$, and $G_2^{120°}$.

$$G_2^\theta = k_{21}(\theta)G_2^{0°} + k_{22}(\theta)G_2^{60°} + k_{23}(\theta)G_2^{120°} \qquad \text{Expression 10}$$

A coefficient $k_{2i}(\theta)$ of Expression (10) is expressed by Expression (11).

$$k_{2i}(\theta) = \frac{1}{3}\{1 + 2\cos(2(\theta - \theta_i))\} \qquad \text{Expression 11}$$

In this regard, in Expression (11), $\theta_1$, $\theta_2$, and $\theta_3$ are 0 degree, 60 degrees, and 120 degrees, respectively.

Figure 4:
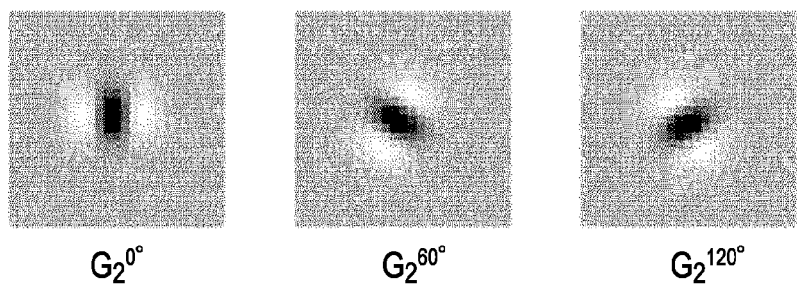
FIG. 4 is a diagram illustrating the derivatives of a Gaussian function.

Here, FIG. 4 illustrates the three second-order derivatives $G_2^{0°}$, $G_2^{60°}$, and $G_2^{120°}$ as the basis functions of the second-order derivative $G_2^\theta$.

The second-order derivatives $G_2^{60°}$ is obtained by rotating the second-order derivatives $G_2^{0°}$ by 60 degrees, and the second-order derivatives $G_2^{120°}$ is obtained by rotating the second-order derivatives $G_2^{0°}$ by 120 degrees.

The third-order derivative $G_3^\theta$ can be expressed by Expression (12) using 4 third-order derivatives $G_3^{0°}$, $G_3^{45°}$, $G_3^{90°}$, and $G_3^{135°}$ as the basis functions.

$$G_3^\theta = k_{31}(\theta)G_3^{0°} + k_{32}(\theta)G_2^{45°} + k_{33}(\theta)G_2^{90°} + k_{34}(\theta)G_2^{135°} \qquad \text{Expression 12}$$

A coefficient $k_{3i}(\theta)$ of Expression (12) is expressed by Expression (13).

$$k_{3i}(\theta) = \frac{1}{4}\{2\cos(\theta - \theta_i) + 2\cos(3(\theta - \theta_i))\} \qquad \text{Expression 13}$$

In this regard, in Expression (13), $\theta_1$, $\theta_2$, $\theta_3$, and $\theta_4$ are 0 degree, 45 degrees, 90 degrees, and 135 degrees, respectively.

Figure 5:
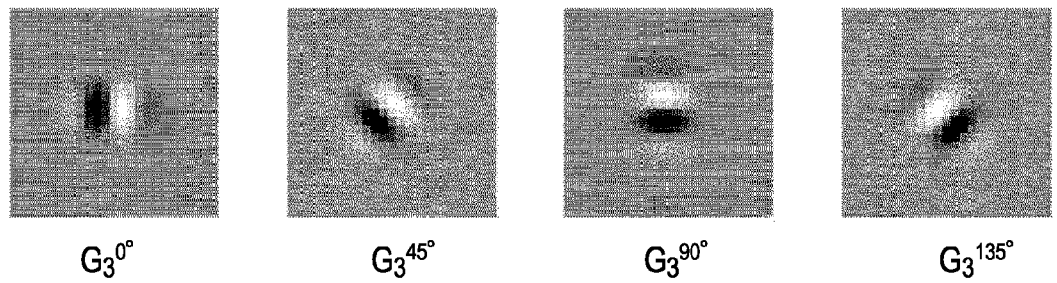
FIG. 5 is a diagram illustrating the derivatives of a Gaussian function.

Here, FIG. 5 illustrates the 4 third-order derivatives $G_3^{0°}$, $G_3^{45°}$, $G_3^{90°}$, and $G_3^{135°}$ as the basis functions of the third-order derivative $G_3^\theta$.

The third-order derivatives $G_3^{45°}$ is obtained by rotating the third-order derivatives $G_3^{0°}$ by 45 degrees, the third-order derivatives $G_3^{90°}$ is obtained by rotating the third-order derivatives $G_3^{0°}$ by 90 degrees, and the third-order derivatives $G_3^{135°}$ is obtained by rotating the third-order derivatives $G_3^{0°}$ by 135 degrees.

Figure 6:
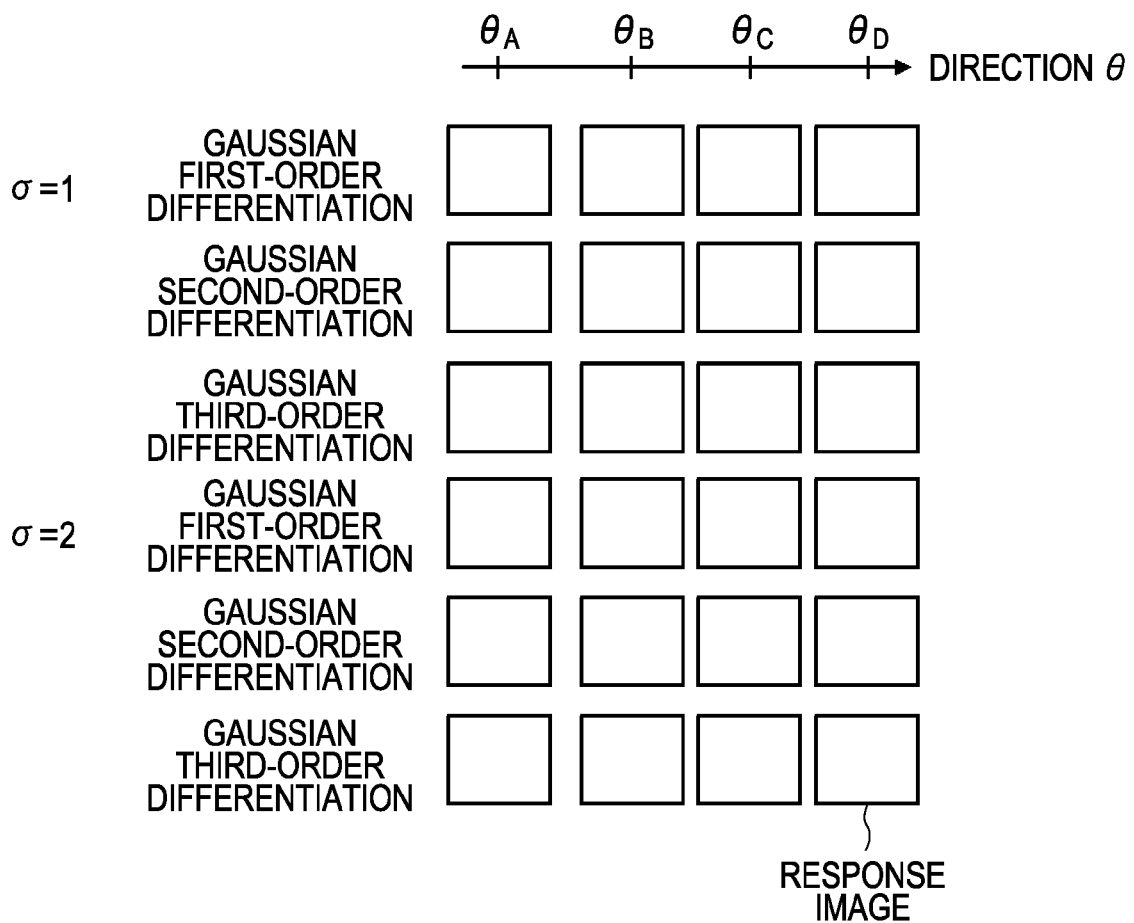
FIG. 6 is a diagram illustrating response images.

FIG. 6 illustrates response images of the model image output from the filter section 41 of FIG. 2.

The filter section 41 filters the model image in the first-order derivative $G_1^\theta$, the second-order derivative $G_2^\theta$, and the third-order derivative $G_3^\theta$ as derivatives based on Gaussian functions G(x,y) of two scales σ=1 and 2, four angle $\theta=\theta_A, \theta_B, \theta_C$, and $\theta_D$ directions, and three differentiations c=1, 2, and 3.

Therefore, the filter section 41 produces a number of combinations based on the two scales σ=1 and 2, the four angle $\theta=\theta_A, \theta_B, \theta_C$, and $\theta_D$ directions, and the three differentiations c=1, 2, and 3 from one model image, that is, 24 response images, and supplies the response images to the feature-point feature-quantity calculating section 42.

A function used as a filter in the filter section 41 is not limited to a Gaussian function. In FIGS. 3 to 6, the derivatives based on the Gaussian functions G(x,y) of two scales σ=1 and 2, four angle $\theta=\theta_A, \theta_B, \theta_C$, and $\theta_D$ directions, and three differentiations c=1, 2, and 3 have been adopted as filters. The scale σ, the angle θ, and the number of differentiations c are not limited to the above-described values. It is possible to adopt a function other than the derivative of the Gaussian function G(x,y).

Next, a process of the feature-point feature-quantity calculating section 42 of FIG. 2 will be described with reference to FIGS. 7 and 8.

As described with reference to FIG. 6, the filter section 41 produces 24 response images from one model image and supplies the response images to the feature-point feature-quantity calculating section 42.

Among the 24 response images produced from one model image, one response image is observed. Among feature points (to be exact, points on the image having the same positions as feature points of the model image) of the observed response image (hereinafter, also referred to as observation response image), one feature point is observed.

The feature-point feature-quantity calculating section 42 sets a feature-point area having the center of the observed feature point (hereinafter, also referred to as observation feature point) among feature points from the feature-point extracting section 11 (FIG. 1) for the observation response image. The feature-point feature-quantity calculating section 42 divides the feature-point area into a plurality of small areas by separating the feature-point area in an angular direction and a distance direction on the basis of the observation feature point.

Figure 7:
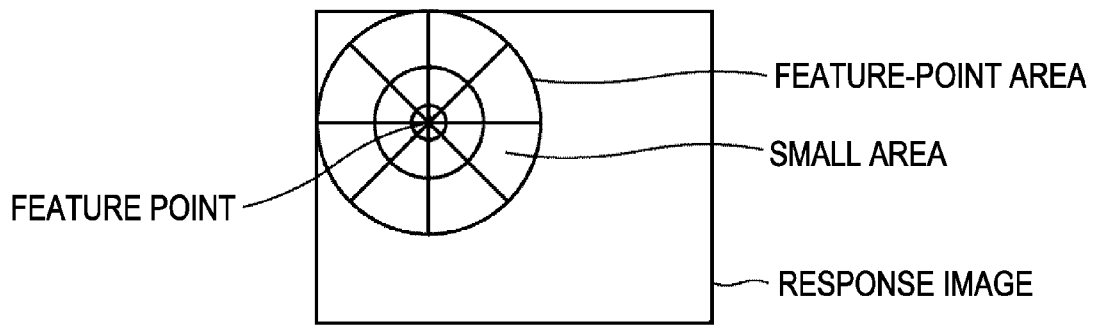
FIG. 7 is a diagram illustrating a feature-point area.

FIG. 7 illustrates a feature-point area and a plurality of small areas into which the feature-point area is divided.

For example, the feature-point feature-quantity calculating section 42 sets a circular area having the center of an observation feature point and having a fixed radius to the feature-point area, and divides the feature-point area into a plurality of small areas by separating the feature-point area in an angular direction and a distance direction on the basis of the observation feature point.

In FIG. 7, the feature-point area is separated in 8 angular directions and 3 distance directions, and is divided into 24 small areas in total.

The number of angular directions or the number of distance directions by which the feature-point area is separated is not particularly limited.

For example, the feature-point feature-quantity calculating section 42 produces an average value of pixel values of a small area (pixel values of pixels within the small area) as a statistical quantity of the small area for each of the 24 small areas obtained for the observation feature point.

The feature-point feature-quantity calculating section 42 produces 6 types of feature quantities corresponding to a number of combinations of two scales $\sigma=1$ and 2 and three differentiations $c=1, 2,$ and 3 as feature-point feature-quantities by employing a vector having components of average values of pixel values of small areas produced from 4 response images obtained by filtering in each of derivatives based on a Gaussian function $G(x,y)$ of the same scale $\sigma$, four angle $\theta=\theta_A, \theta_B, \theta_C,$ and $\theta_D$ directions and the same number of differentiations $c$ as one type of feature quantity of the observation feature point.

Figure 8:
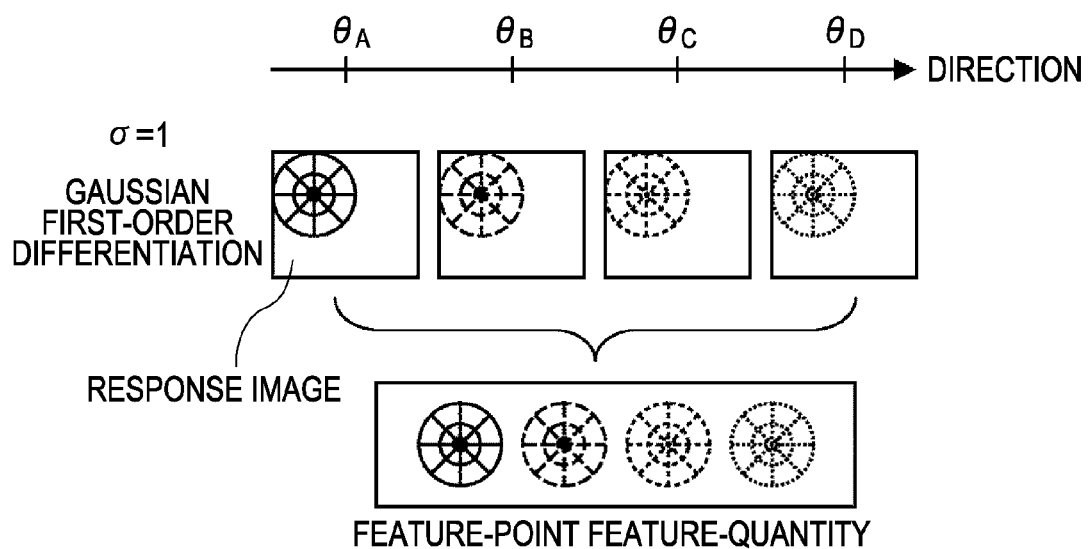
FIG. 8 is a diagram illustrating one type of feature quantity.

FIG. 8 is a diagram illustrating one type of feature quantity produced by the feature-point feature-quantity calculating section 42.

In FIG. 8, average values of pixel values of 24 small areas per response image (hereinafter, also referred to as small-area average values) are produced for an observation feature point from each of 4 response images obtained by filtering in each of derivatives (first-order derivatives) based on a Gaussian function $G(x,y)$ of a scale $\sigma=1$, four angle $\theta=\theta_A, \theta_B, \theta_C,$ and $\theta_D$ directions and the number of differentiations $c=1$.

In total, 96 small-area average values are produced from 4 response images obtained by filtering in each of the derivatives based on a Gaussian function $G(x,y)$ of the same scale $\sigma$, four angle $\theta=\theta_A, \theta_B, \theta_C,$ and $\theta_D$ directions, and the same number of differentiations $c$.

The feature-point feature-quantity calculating section 42 uses a 96-dimensional vector having components of the 96 small-area average values as one type of feature quantity of the observation feature point.

In addition to the case where the scale $\sigma=1$ and the number of differentiations $c=1$, the feature-point feature-quantity calculating section 42 produces a 96-dimensional vector having components of the 96 small-area average values as one type of feature quantity of the observation feature point even for each of the cases where the scale $\sigma=1$ and the number of differentiations $c=2$, the case where the scale $\sigma=1$ and the number of differentiations $c=3$, the case where the scale $\sigma=2$ and the number of differentiations $c=1$, the case where the scale $\sigma=2$ and the number of differentiations $c=2$, and the case where the scale $\sigma=2$ and the number of differentiations $c=3$.

Consequently, the feature-point feature-quantity calculating section 42 produces 6 types of feature quantities (six 96-dimensional vectors) as feature-point feature-quantities of the observation feature point.

As described above, the feature-point feature-quantity extracting section 12 produces a vector having components of average values of pixel values of small areas produced from a response image obtained by filtering in each of derivatives based on Gaussian functions $G(x,y)$ of a plurality of scales $\sigma=1$ and 2, a plurality of angle $\theta=\theta_A, \theta_B, \theta_C,$ and $\theta_D$ directions, and a plurality of differentiations $c=1, 2,$ and 3 as a feature-point feature-quantity of the observation feature point.

Here, in the related art of J. J. Yokono and T. Poggio, "Oriented Filters for Object Recognition: an empirical study", FG 2004, a feature-point feature-quantity having high discrimination is produced by setting a vector having components of pixel values of feature points of a plurality of response images obtained by filtering in each of derivatives based on Gaussian functions $G(x,y)$ of a plurality of scales $\sigma$ and a plurality of angle $\theta$ directions as a feature-point feature-quantity.

On the other hand, the learning device of FIG. 1 produces feature-point feature-quantities from a plurality of response images corresponding to combinations of a plurality of scales $\sigma$, a plurality of angle $\theta$ directions, and a plurality of the derivatives by filtering a model image in each of the derivatives based on Gaussian functions $G(x,y)$ of a plurality of scales $\sigma=1$ and 2, a plurality of angle $\theta=\theta_A, \theta_B, \theta_C,$ and $\theta_D$ directions, and a plurality of differentiations $c=1, 2,$ and 3. Therefore, a feature-point feature-quantity with higher discrimination in which change states of a pixel value in various directions, that is, information of various textures of an image, have been reflected can be obtained from the image (here, the model image).

The learning device of FIG. 1 uses an average value of pixel values of a plurality of small areas obtained by separating a feature-point area having a center of a feature point in a response image in an angular direction and a distance direction on the basis of the feature point as a feature-point feature-quantity.

Therefore, a feature-point feature-quantity having high discrimination can be obtained in which a peripheral distribution has been reflected in responses of a plurality of filters with different characteristics in each of the derivatives based on Gaussian functions $G(x,y)$ of a plurality of scales $\sigma=1$ and 2, a plurality of angle $\theta=\theta_A, \theta_B, \theta_C,$ and $\theta_D$ directions, and a plurality of differentiations $c=1, 2,$ and 3.

A feature-point feature-quantity robust to the tilt (rotation) or distortion of a subject viewed in an image, that is, a feature-point feature-quantity having improved invariance, can be obtained by producing feature-point feature-quantities from a plurality of small areas around a feature point and setting an average value as a statistical quantity of pixel values of a small area to a feature-point feature-quantity.

Description of Feature-Point Feature-Quantity Extracting Process

A feature-point feature-quantity extracting process in which the feature-point feature-quantity extracting section 12 of FIG. 2 extracts a feature-point feature-quantity will be described with reference to FIG. 9.

In step S11, the feature-point feature-quantity extracting section 12 selects one model image, which has not yet been selected as an observation image from model images supplied by the feature-point extracting section 11 (FIG. 1), as the observation image. Then, the process proceeds to step S12.

In step S12, the filter section 41 (FIG. 2) of the feature-point feature-quantity extracting section 12 filters the observation image in each of the derivatives based on Gaussian functions $G(x,y)$ of two scales $\sigma=1$ and 2, four angle $\theta=\theta_A, \theta_B, \theta_C,$ and $\theta_D$ directions, and three differentiations $c=1, 2,$ and 3. That is, the filter section 41 produces 24 response images by filtering the observation image as illustrated in FIG. 6.

The filter section 41 supplies the feature-point feature-quantity calculating section 42 with the 24 response images produced from the observation image, and the process proceeds from step S12 to step S13.

In step S13, the feature-point feature-quantity calculating section 42 selects as an observation feature point one feature point which has not been selected as an observation feature point from feature points of the observation image included in feature points of the model image supplied from the feature-point extracting section 11. The process proceeds to step S14.

In step S14, the feature-point feature-quantity calculating section 42 sets a feature-point area having the center of the observation feature point in a response image obtained by filtering in the derivative based on a Gaussian function $G(x,y)$ of the same scale $\sigma$, the same angle $\theta$ direction, and the same number of differentiations $c$, that is, each of 24 response images from the filter section 41.

Then, the process proceeds from step S14 to step S15, and the feature-point feature-quantity calculating section 42 divides the feature-point area of the response image into 24 small areas by separating the feature-point area of the response image in an angular direction and a distance direction on the basis of the observation feature point in each of the 24 response images as illustrated in FIG. 7.

The process proceeds from step S15 to step S16, and the feature-point feature-quantity calculating section 42 produces a small-area average value of each of the 24 small areas obtained by dividing the feature-point area of the observation feature point in each of the 24 response images. The process proceeds to step S17.

In step S17, the feature-point feature-quantity calculating section 42 produces 6 types of feature quantities corresponding to a number of combinations of two scales $\sigma=1$ and 2 and three differentiations $c=1, 2,$ and 3 as feature-point feature-quantities of the observation feature point by employing a vector having components of average values of pixel values of small areas produced from response images obtained by filtering in each of derivatives based on a Gaussian function $G(x,y)$ of the same scale $\sigma$, four angle $\theta=\theta_A, \theta_B, \theta_C,$ and $\theta_D$ directions, and the same number of differentiations $c$ as one type of feature quantity of the observation feature point.

Then, the process proceeds from step S17 to step S18, and the feature-point feature-quantity extracting section 12 determines whether all feature-point feature-quantities of feature points of the observation image have been produced. When all the feature-point feature-quantities of the feature points of the observation image have not yet been produced in step S18, that is, when there is a feature point which has not yet been selected as an observation feature point among the feature points of the observation image, the process returns to step S13.

In step S13, the feature-point feature-quantity calculating section 42 newly selects one feature point which has not yet been selected as the observation feature point from the feature points of the observation image. In the following, the same process is repeated.

When it has been determined that all the feature-point feature-quantities of the feature points of the observation image have been produced in step S18, the process proceeds to step S19. The feature-point feature-quantity extracting section 12 determines whether feature-point feature-quantities for all model images from the feature-point extracting section 11 (FIG. 1) have been produced.

When the feature-point feature-quantities for all the model images from the feature-point extracting section 11 have not yet been produced in step S19, that is, when there is a model image which has not yet been selected as the observation image among the model images from the feature-point extracting section 11, the process returns to step S11.

In step S11, the feature-point feature-quantity extracting section 12 newly selects one model image which has not yet been selected as the observation image from the model images from the feature-point extracting section 11. In the following, the same process is repeated.

When it has been determined that the feature-point feature-quantities for all the model images from the feature-point extracting section 11 have been produced in step S19, the feature-point feature-quantity extracting process is terminated.

The feature-point feature-quantity extracting section 12 supplies the feature-point feature-quantity storage section 13 (FIG. 1) with the feature-point feature-quantities of the model images produced by the feature-point feature-quantity extracting process, and the feature-point feature-quantity storage section 13 stores the feature-point feature-quantities.

The feature-point feature-quantity extracting section 12 can perform vector quantization for the feature-point feature-quantities of the model images, and can store vector quantization results (codes) as target feature-point feature-quantities of the model images in the feature-point feature-quantity storage section 13.

Here, (the feature-point feature-quantity calculating section 42 of) the feature-point feature-quantity extracting section 12 produces 6 types of feature quantities (six 96-dimensional vectors) using a 96-dimensional vector, having 96 small-area average values as components for one feature point, as one type of feature quantity of the observation feature point as described with reference to FIGS. 8 and 9.

When vector quantization of a feature-point feature-quantity is performed in the feature-point feature-quantity extracting section 12, the vector quantization is performed for every type of feature quantity (96-dimensional vector).

Here, a codebook is necessary for the vector quantization, but the codebook can be generated, for example, by a k-means algorithm or the like. As in the vector quantization, 6 types of codebooks are generated by generating a codebook for every type of feature quantity (96-dimensional vector). The number of code vectors of the codebook (the number of clusters of vector quantization) may be, for example, 400 or the like.

Description of Process of Total-Feature-Quantity Generating Section 23

A process to be executed by the total-feature-quantity generating section 23 of FIG. 1 will be described with reference to FIG. 10.

In the learning device of FIG. 1, the feature-point extracting section 11 and the feature-point feature-quantity extracting section 12 produce feature-point feature-quantities of a model image and store the feature-point feature-quantities in the feature-point feature-quantity storage section 13 as described above.

Like the feature-point extracting section 11 and the feature-point feature-quantity extracting section 12, the feature-point extracting section 21 and the feature-point feature-quantity extracting section 22 produce feature-point feature-quantities of a generation image and supply the feature-point feature-quantities to the total-feature-quantity generating section 23.

The total-feature-quantity generating section 23 produces a total feature quantity indicating a feature of the entire generation image (a relative feature based on the model image) from the feature-point feature-quantities of the generation image supplied by the feature-point feature-quantity extracting section 22 on the basis of the feature-point feature-quantities stored in the feature-point feature-quantity storage section 13.

FIG. 10 illustrates an example of a total feature quantity produced by the total-feature-quantity generating section 23.

For example, the total-feature-quantity generating section 23 can produce a histogram of feature-point feature-quantity values of a generation image from the feature-point feature-quantity extracting section 22 in which feature-point feature-quantity values as values of feature-point feature-quantities of a model image stored in the feature-point feature-quantity storage section 13 (FIG. 1) are ranked, as a total feature quantity of the generation image.

For example, the total-feature-quantity generating section 23 can produce a correlation value of feature-point feature-quantity values of the generation image from the feature-point feature-quantity extracting section 22 to feature-point feature-quantities of the model image stored in the feature-point feature-quantity storage section 13 as a total feature quantity of the generation image.

Figure 10A:
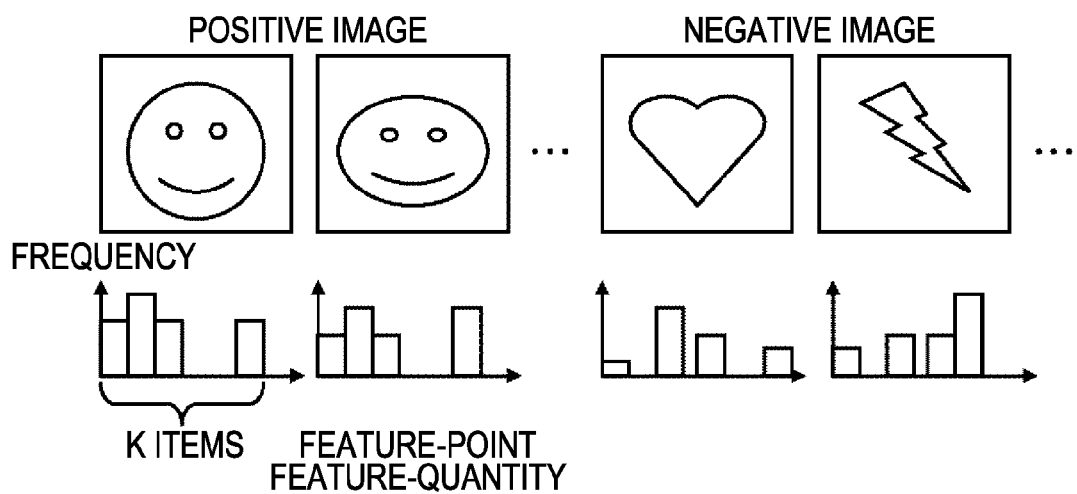
FIGS. 10A and 10B are diagrams illustrating a process of a total-feature-quantity generating section.

FIG. 10A illustrates a histogram of feature-point feature-quantity values produced as a total feature quantity (hereinafter, also referred to as a feature-point feature-quantity value histogram) for each of positive and negative images included in generation images.

Figure 10B:
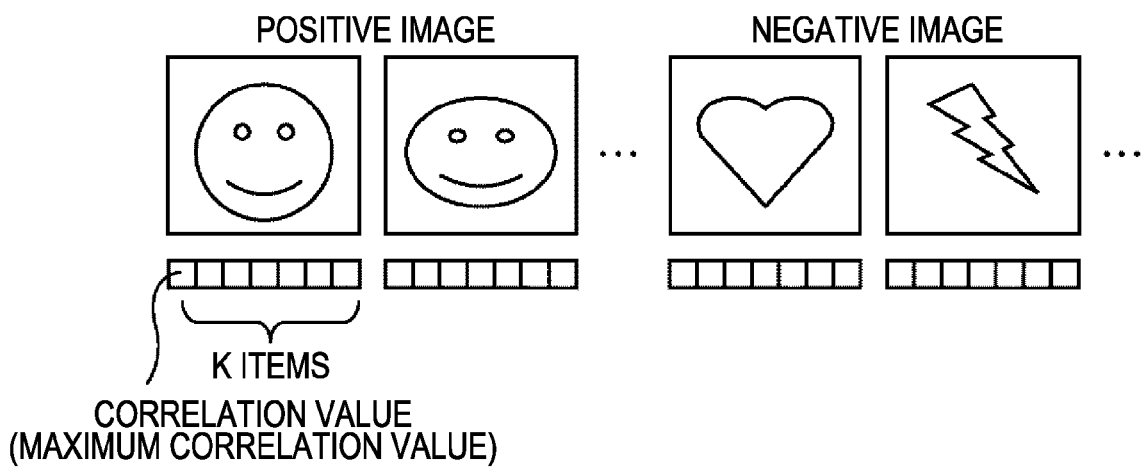

FIG. 10B illustrates a correlation value of feature-point feature-quantity values produced as a total feature quantity (hereinafter, also referred to as a feature-point feature-quantity correlation value) for each of the positive and negative images included in the generation images.

The feature-point feature-quantity value histogram of FIG. 10A can be produced as follows.

That is, for simplification of the description, it is assumed that a feature-point feature-quantity is not 6 types of feature quantities, but is one type of feature quantity (96-dimensional vector).

The number of feature-point feature-quantity values (types) stored in the feature-point feature-quantity storage section 13 (FIG. 1) is assumed to be K.

When a certain feature point of a generation image is observed, the total-feature-quantity generating section 23 increments the frequency of a rank closest to a feature-point feature-quantity value of the observed feature point (observation feature point) in the generation image among K ranks (feature-point feature-quantity values) using the K feature-point feature-quantity values (96-dimensional vectors) stored in the feature-point feature-quantity storage section 13 as the ranks (the horizontal axis of the histogram) by 1.

The total-feature-quantity generating section 23 counts the frequencies of the K ranks using feature-point feature-quantity values of all feature points of the generation image as objects, and outputs a K-dimensional vector, having the frequencies of the K ranks of the histogram (feature-point feature-quantity value histogram) obtained thereby as components, as a total feature quantity of the generation image.

When the feature-point feature-quantity is 6 types of feature quantities (96-dimensional vectors) as described above, a feature-point feature-quantity value histogram is produced for every type and a 6×K-dimensional vector having a total of frequencies of 6×K ranks of 6 feature-point feature-quantity value histograms in 6 types as components is regarded as a total feature quantity of the generation image.

Here, the feature-point feature-quantity value histogram as the total feature quantity is a BoF histogram (G. Csurka, C. Bray, C. Dance, and L. Fan, "Visual Categorization with Bags of Keypoints", ECCV 2004), and represents an extent in which a feature-point feature-quantity value present in the model image exists in the generation image.

A feature-point feature-quantity correlation value of FIG. 10B can be produced as follows.

That is, here, for simplification of the description, it is assumed that a feature-point feature-quantity is one type of feature quantity (vector), and the number of feature-point feature-quantity values (types) of feature points stored in the feature-point feature-quantity storage section 13 (FIG. 1) is assumed to be K.

The total-feature-quantity generating section 23 calculates correlation values of feature-point feature-quantity values of each of feature points of the generation image to an observation value by sequentially employing K feature-point feature-quantity values (96-dimensional vectors) of the model image stored in the feature-point feature-quantity storage section 13 as the observation value.

The total-feature-quantity generating section 23 detects a maximum value of the correlation values of the feature-point feature-quantity values of each of the feature points of the generation image to the observation value, and outputs a K-dimensional vector, having a total of K feature-point feature-quantity correlation values obtained from K feature-point feature-quantity values of the model image as components, as a total feature quantity of the generation image.

When the feature-point feature-quantity is 6 types of feature quantities (96-dimensional vectors) as described above, K feature-point feature-quantity correlation values are produced for every type and a 6×K-dimensional vector having a total of 6×K feature-point feature-quantity correlation values for 6 types as components is regarded as a total feature quantity of the generation image.

A value proportional to an inner product of a vector as a feature-point feature-quantity value of the model image and a vector as a feature-point feature-quantity value of a feature point of the generation image can be adopted as a correlation value of the feature-point feature-quantity value of the feature point of the generation image to the feature-point feature-quantity value (observation value) of the model image.

Here, a feature-point feature-quantity correlation value as a total feature quantity represents an extent in which a feature-point feature-quantity present in the generation image is similar to a feature-point feature-quantity value present in the model image.

A method of performing identification using a correlation value of a feature-point feature-quantity value of a model image and a feature-point feature-quantity value of a generation image is disclosed in Japanese Unexamined Patent Application Publication No. 2007-128195. According to the method disclosed in Japanese Unexamined Patent Application Publication No. 2007-128195, only feature-point feature-quantity values of feature points close to a position of a feature point corresponding to an observation value of the model image among feature points on the generation image are used as an object, correlation values with the observation value of the model image are produced, and a maximum value of the correlation values is adopted as a total feature quantity.

The total feature quantity is not limited to a feature-point feature-quantity value histogram or a feature-point feature-quantity correlation value.

Figure 11:
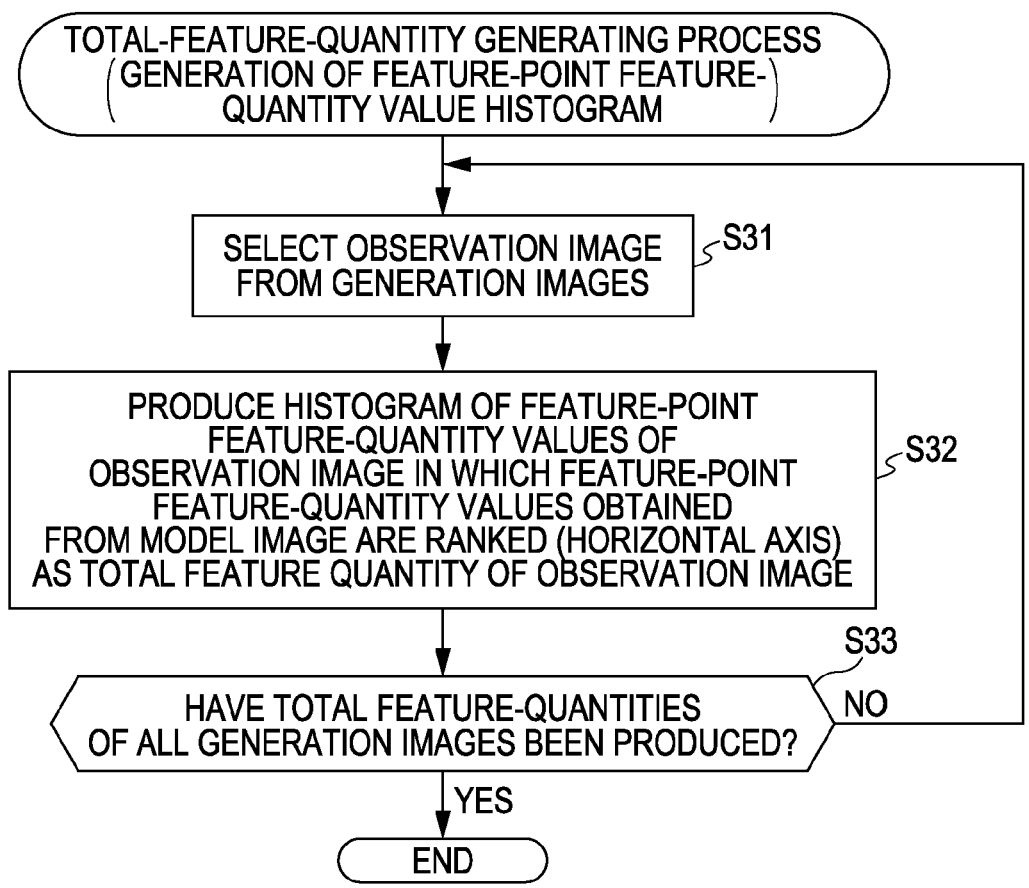
FIG. 11 is a flowchart illustrating a total-feature-quantity generating process.

FIG. 11 is a flowchart illustrating a total-feature-quantity generating process in which the total-feature-quantity generating section 23 produces a feature-point feature-quantity value histogram as a total feature quantity of a generation image.

In step S31, the total-feature-quantity generating section 23 selects one generation image, which has not yet been selected as an observation image among generation images of feature-point feature-quantities supplied from the feature-point feature-quantity extracting section 22 (FIG. 1), as the observation image. Then, the process proceeds to step S32.

In step S32, the total-feature-quantity generating section 23 can produce a histogram of feature-point feature-quantity values of the observation image in which feature-point feature-quantity values of a model image (hereinafter, also referred to as model feature-quantity values) stored in the feature-point feature-quantity storage section 13 (FIG. 1) are ranked, as a total feature quantity of the observation image, and supplies the total feature quantity to the identifier generating section 24.

The process proceeds from step S32 to step S33, and the total-feature-quantity generating section 23 determines whether or not total feature quantities of all generation images of feature-point feature-quantities supplied from the feature-point feature-quantity extracting section 22 have been produced.

When it has been determined that the total feature quantities of all the generation images of the feature-point feature-quantities supplied from the feature-point feature-quantity extracting section 22 have not yet been produced in step S33, the process returns to step S31. In the following, the same process is repeated.

When it has been determined that the total feature quantities for all the generation images of the feature-point feature-quantities supplied from the feature-point feature-quantity extracting section 22 have been produced in step S33, the total-feature-quantity generating process is terminated.

Figure 12:
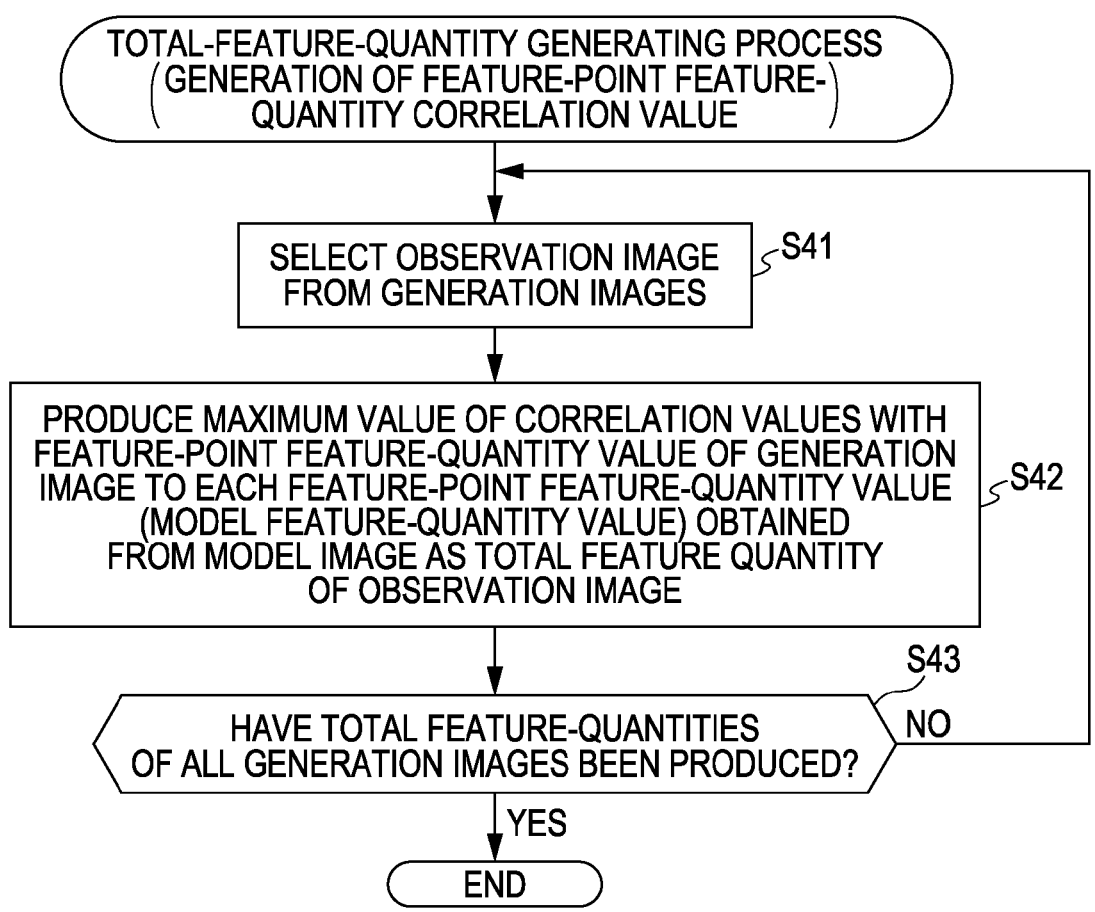
FIG. 12 is a flowchart illustrating a total-feature-quantity generating process.

FIG. 12 is a flowchart illustrating a total-feature-quantity generating process in which the total-feature-quantity generating section 23 produces a feature-point feature-quantity correlation value as a total feature quantity of a generation image.

In step S41, the total-feature-quantity generating section 23 selects one generation image, which has not yet been selected as an observation image among generation images of feature-point feature-quantities supplied from the feature-point feature-quantity extracting section 22 (FIG. 1), as the observation image. Then, the process proceeds to step S42.

In step S42, the total-feature-quantity generating section 23 can produce a maximum value of correlation values with each feature-point feature-quantity value of feature points of the generation image to each model feature-quantity value stored in the feature-point feature-quantity storage section 13 (FIG. 1) as a feature-point feature-quantity correlation value. The total-feature-quantity generating section 23 supplies the identifier generating section 24 with the feature-point feature-quantity correlation value as a total feature quantity of the observation image. Then, the process proceeds from step S42 to step S43.

In step S43, the total-feature-quantity generating section 23 determines whether total feature quantities for all generation images of feature-point feature-quantities supplied from the feature-point feature-quantity extracting section 22 have been produced.

When it has been determined that the total feature quantities for all the generation images of the feature-point feature-quantities supplied from the feature-point feature-quantity extracting section 22 have not yet been produced in step S43, the process returns to step S41. In the following, the same process is repeated.

When it has been determined that the total feature quantities for all the generation images of the feature-point feature-quantities supplied from the feature-point feature-quantity extracting section 22 have been produced in step S43, the total-feature-quantity generating process is terminated.

Here, a component of a vector as a total feature quantity produced in the total-feature-quantity generating section 23 (for example, the frequency of the feature-point feature-quantity value histogram or the feature-point feature-quantity correlation value described above) is a dimensional feature quantity described with reference to FIG. 1.

Process of Identifier Generating Section 24

The outline of a process of the identifier generating section 24 of FIG. 1 will be described with reference to FIG. 13.

For example, the identifier generating section 24 selects (a dimension of) a dimensional feature quantity for use in identification among dimensional feature quantities constituting a total feature quantity from the total-feature-quantity generating section 23 according to a boosting algorithm, and generates an identifier for performing identification using the dimensional feature quantity.

That is, the identifier generating section 24 generates an identifier for performing identification using the dimensional feature quantity which decreases an error value indicating a level at which a positive image and a negative image are erroneously identified among a plurality of dimensional feature quantities (vector components) constituting a total feature quantity from the total-feature-quantity generating section 23 (FIG. 1), and generates dimensional information indicating the dimension of the dimensional feature quantity which decreases the error value.

Figure 13:
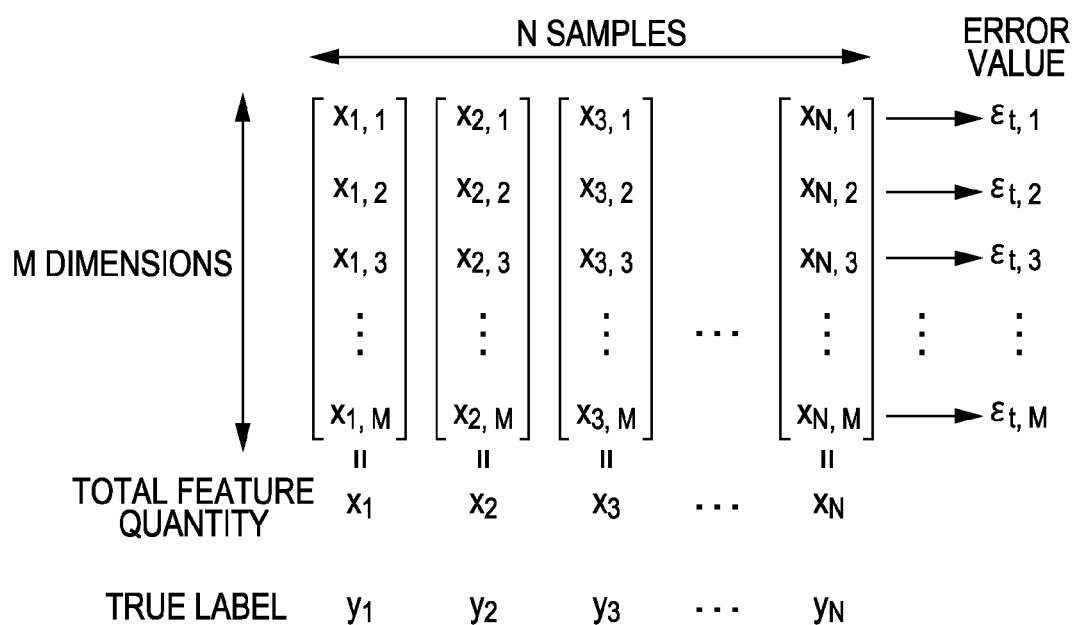
FIG. 13 is a diagram illustrating a process of an identifier generating section.

Specifically, it is assumed that N images exist as generation images, and the total-feature-quantity generating section 23 obtains vectors as total feature quantities $x_1, x_2, \ldots, x_N$ of N samples of N generation images as illustrated in FIG. 13.

As illustrated in FIG. 13, it is assumed that the total feature quantity $x_i$ ($i=1, 2, \ldots, N$) is an M-dimensional vector having M components (dimensional feature quantities) $x_{i,1}, x_{i,2}, \ldots, x_{i,M}$.

As described with reference to FIG. 1, a true label is supplied to the identifier generating section 24. The true label of an $i^{th}$ sample $i^{th}$ generation image) is denoted by $y_i$. For example, the true label $y_i$ becomes +1 when the $i^{th}$ generation image is a positive image, and the true label $y_i$ becomes −1 when the $i^{th}$ generation image is a negative image.

The identifier generated by the identifier generating section 24 is a function for performing identification using a dimensional feature quantity $x_{i,d}$ which decreases an error value indicating an extent to which a positive image and a negative image are erroneously identified among the M dimensional feature quantities $x_{i,1}$ to $x_{i,M}$ constituting the total feature quantity $x_i$, and includes a plurality of weak learners $h_{t,d}(x_{i,d})$.

Here, the suffix t of the weak learners $h_{t,d}(x_{i,d})$ is a variable for counting the number of weak learners $h_{t,d}(x_{i,d})$, and the identifier includes T weak learners $h_{1,d}(x_{i,d})$, $h_{2,d}(x_{i,d})$, ..., $h_{T,d}(x_{i,d})$.

For example, the number of weak learners $h_{t,d}(x_{i,d})$, T, is empirically set, or is set to a value equal to or less than M so that an identification ratio of identification by the identifier is equal to or greater than a certain level value.

The weak learner $h_{t,d}(x_{i,d})$ is a function of outputting an identification result indicating whether a generation image is a positive or negative image using a $d^{th}$ dimensional feature quantity (a $d^{th}$ component of a vector as the total feature quantity $x_i$) $x_{i,d}$ of the total feature quantity $x_i$ of the generation image as an input. For example, the weak learner outputs +1 when the identification result indicates the positive image, and outputs −1 when the identification result indicates the negative image.

When an error value of the identification result of the weak learner $h_{t,d}(x_{i,d})$ is denoted by $\epsilon_{t,d}$, the identifier generating section 24 determines the weak learner $h_{t,d}(x_{i,d})$ to decrease the error value $\epsilon_{t,d}$.

Here, for simplification of the description, it is assumed that the weak learner $h_{t,d}(x_{i,d})$ adopts, for example, a function of outputting +1 indicating the identification result of the positive image when the $d^{th}$ dimensional feature quantity $x_{i,d}$ as a parameter is equal to or greater than a predetermined threshold value, and outputting −1 indicating the identification result of the negative image when the $d^{th}$ dimensional feature quantity $x_{i,d}$ is less than the predetermined threshold value.

In this case, when the weak learner $h_{t,d}(x_{i,d})$ is determined to decrease the error value $\epsilon_{t,d}$, it means that the threshold value of the weak learner $h_{t,d}(x_{i,d})$ is determined. The threshold value of the weak learner $h_{t,d}(x_{i,d})$ is determined to be equal to or greater than a minimum value and equal to or less than a maximum value of N $d^{th}$ dimensional feature quantities $x_{1,d}, x_{2,d}, \ldots, x_{N,d}$ which can be parameters.

The identifier generating section 24 determines each of the weak learners $h_{t,1}(x_{i,1}), h_{t,2}(x_{i,2}), \ldots, h_{t,M}(x_{i,M})$ to decrease each of the error values $\epsilon_{t,1}, \epsilon_{t,2}, \ldots, \epsilon_{t,M}$, and produces a dimension (hereinafter, also referred to as a minimum error dimension) d(t) for obtaining a minimum value of the error values $\epsilon_{t,1}$ to $\epsilon_{t,M}$.

The identifier generating section 24 produces a weight $D_t(i)$ of making the error value $\epsilon_{t,d}$ affect an error of the identification result of the generation image for every generation image according to whether or not the identification result of an $i^{th}$ generation image by the weak learner $h_{t,d}(x_{i,d})$ matches the true label $y_i$, that is, whether the expression $h_{t,d}(x_{i,d})=y_i$ is established or whether the expression $h_{t,d}(x_{i,d}) \neq y_i$ is established.

Here, the error value $\epsilon_{t,d}$ can be produced by adding the weight $D_t(i)$ of a generation image for which the identification result by the weak learner $h_{t,d}(x_{i,d})$ is erroneous among N generation images.

The identifier generating section 24 generates an identifier H(x) including T weak learners $h_{1,d}(x_{i,d}), h_{2,d}(x_{i,d}), \ldots, h_{T,d}(x_{i,d})$ and dimensional information indicating minimum error dimensions d(1), d(2), ..., d(T) by determining the weak learner $h_{t,d}(x_{i,d})$ to decrease the error value $\epsilon_{t,d}$, producing a dimension (minimum error dimension) d(t) capable of obtaining the minimum value of the error values $\epsilon_{t,1}$ to $\epsilon_{t,M}$ of the identification result of the generation image by the weak learner $h_{t,d}(x_{i,d})$, producing the weight $D_t(i)$ to be used to calculate the error value $\epsilon_{t,d}$, and repeating the above process T times.

Figure 14:
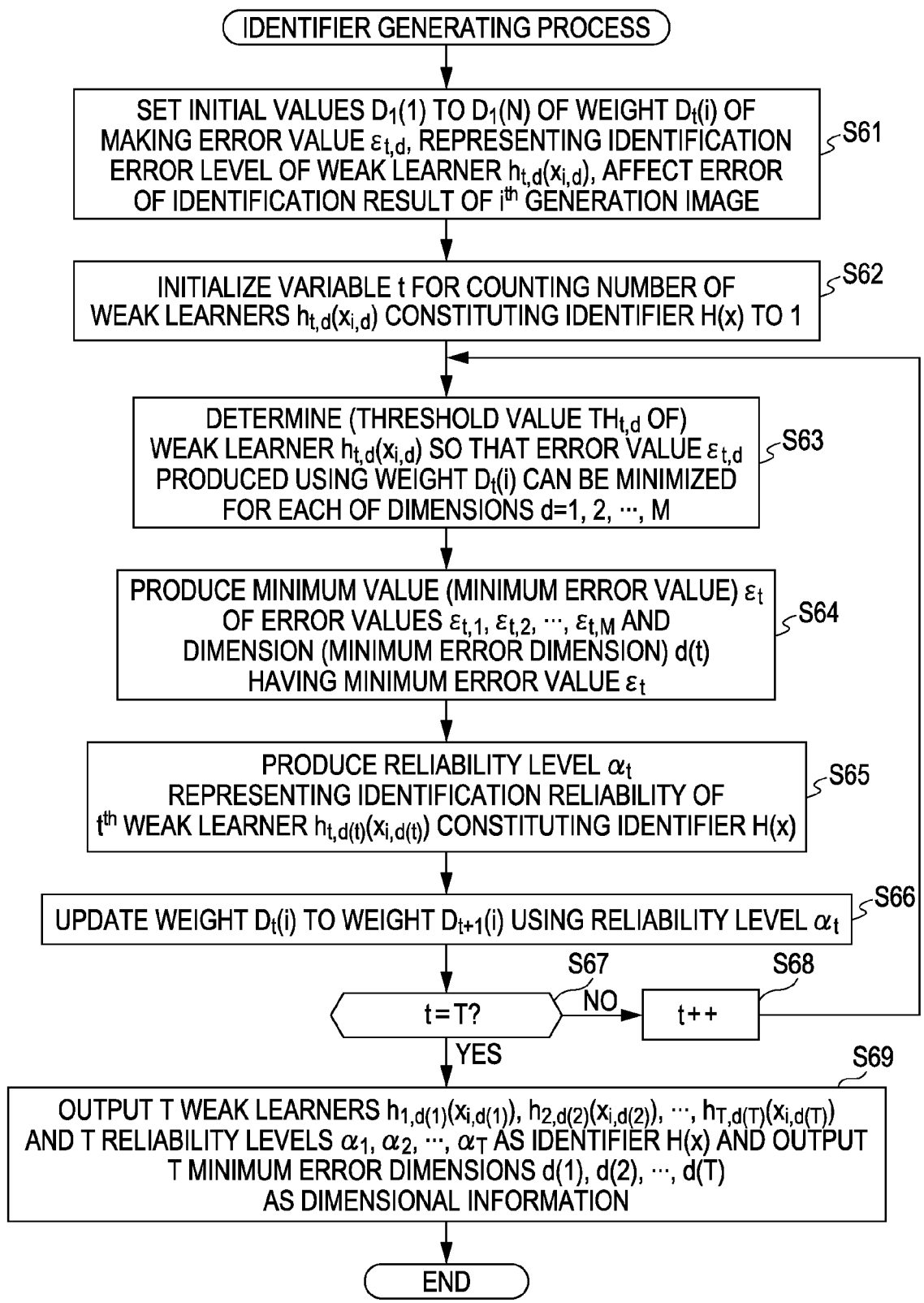
FIG. 14 is a flowchart illustrating an identifier generating process.

An identifier generating process in which the identifier generating section 24 of FIG. 1 generates an identifier and dimensional information will be described with reference to FIG. 14.

In step S61, the identifier generating section 24 sets initial values $D_1(1), D_1(2), \ldots, D_1(N)$ of the weight $D_t(i)$ of making the error value $\epsilon_{t,d}$, representing an identification error level of the weak learner $h_{t,d}(x_{i,d})$, affect an error of the identification result of the $i^{th}$ generation image, for example, according to Expression (14). The process proceeds to step S62.

$$D_t(i) = \frac{1}{N} \qquad \text{Expression 14}$$

In step S62, the identifier generating section 24 initializes a variable t for counting the number of weak learners $h_{t,d}(x_{i,d})$ constituting the identifier H(x) to 1. The process proceeds to step S63.

In step S63, the identifier generating section 24 determines (a threshold value $TH_{t,d}$ of) the weak learner $h_{t,d}(x_{i,d})$ so that the error value $\epsilon_{t,d}$ produced using the weight $D_t(i)$ can be minimized for dimensions d=1, 2, ..., M of the total feature quantity $x_i$. The process proceeds to step S64.

Here, in step S63, the identifier generating section 24 determines the threshold value $TH_{t,d}$ of the weak learner $h_{t,d}(x_{i,d})$ so that the error value $\epsilon_{t,d}$ calculated according to, for example, Expression (15), can be minimized.

$$\varepsilon_{t,d} = \sum_{i=1}^{N} D_t(i)[y_i \neq h_{t,d}(x_{i,d})] \qquad \text{Expression 15}$$

In Expression (15), $[y_i \neq h_{t,d}(x_{i,d})]$ is an indicator function, which becomes 1 when the expression $[y_i \neq h_{t,d}(x_{i,d})]$ is established, and becomes 0 when the expression $[y_i \neq h_{t,d}(x_{i,d})]$ is not established.

According to Expression (15), the error value $\epsilon_{t,d}$ can be produced by adding only the weight $D_t(i)$ of a generation image for which the identification result by the weak learner $h_{t,d}(x_{i,d})$ (a generation image for which the expression $y_i \neq h_{t,d}(x_{i,d})$ is established) is erroneous among N generation images.

In step S64, the identifier generating section 24 produces a minimum value $\epsilon_t$ of the error values $\epsilon_{t,1}, \epsilon_{t,2}, \ldots, \epsilon_{t,M}$ calculated according to Expression (15) using the weak learner $h_{t,d}(x_{i,d})$ determined for each of the dimensions d=1, 2, ..., M in the previous step S63. The identifier generating section 24 produces a dimension (minimum error dimension) d(t) (the integer value in the range of 1 to M) in which the minimum value $\epsilon_t$ of the error values $\epsilon_{t,1}, \epsilon_{t,2}, \ldots, \epsilon_{t,M}$ is obtained. The process proceeds from step S64 to step S65.

Here, the minimum error dimension d(t) is a dimension of a dimensional feature quantity for use in identification by the identifier H(x) among dimensional feature quantities constituting a total feature quantity. Therefore, the dimensional feature quantity of the minimum error dimension d(t) among the dimensional feature quantities constituting the total feature quantity is selected for identification by the identifier H(x) for use in identification.

Assuming that the minimum value $\epsilon_t$ of the error values $\epsilon_{t,1}, \epsilon_{t,2}, \ldots, \epsilon_{t,M}$ is the minimum error value $\epsilon_t$, the weak learner $h_{t,d(t)}(x_{i,d(t)})$ becomes a $t^{th}$ weak learner constituting the identifier H(x).

In step S65, the identifier generating section 24 produces a reliability level $\alpha_t$ indicating the identification reliability of a generation image by the $t^{th}$ weak learner $h_{t,d(t)}(x_{i,d(t)})$ constituting the identifier H(x) using the minimum error value $\epsilon_t$ produced in the previous step S64 according to Expression (16). The process proceeds to step S66.

$$\alpha_t = \frac{1}{2}\ln\left(\frac{1-\epsilon_t}{\epsilon_t}\right) \quad \text{Expression 16}$$

Here, according to Expression (16), a value of the reliability level $\alpha_t$ is as small (or large) as the minimum error value $\epsilon_t$ is large (or small).

In step S66, the identifier generating section 24 updates the weight $D_t(i)$ to a weight $D_{t+1}(i)$ according to Expression (17). The process proceeds to step S67.

$$D_{t+1}(i) = \frac{D_t(i)}{Z_t} \times \begin{cases} e^{-\alpha_t} & \text{if } h_{t,d(t)}(x_{i,d(t)}) = y_i \\ e^{\alpha_t} & \text{if } h_{t,d(t)}(x_{i,d(t)}) \neq y_i \end{cases} \quad \text{Expression 17}$$

$$= \frac{D_t(i)}{Z_t} \times e^{-\alpha_t y_i h_{t,d(t)}(x_{i,d(t)})}$$

Here, a coefficient $Z_t$ in Expression (17) is a coefficient for normalizing the weight $D_{t+i}(i)$, and is expressed by Expression (18).

$$Z_t = \sum_{i=1}^{N} D_t(i) e^{-\alpha_t y_i h_{t,d(t)}(x_{i,d(t)})} \quad \text{Expression 18}$$

For the $i^{th}$ generation image for which the identification result by the weak learner $h_{t,d(t)}(x_{i,d(t)})$ is correct, that is, the generation image for which the identification result matches the true label $y_i$, the weight $D_t(i)$ is updated to a weight $D_{t+i}(i)$ having a smaller value according to Expression (17). Consequently, in the next step S63, the error value $\epsilon_{t,d}$ calculated using the weight $D_t(i)$ is decreased.

On the other hand, for the $i^{th}$ generation image for which the identification result by the weak learner $h_{t,d(t)}(x_{i,d(t)})$ is erroneous, that is, the generation image for which the identification result does not match the true label $y_i$, the weight $D_t(i)$ is updated to a weight $D_{t+1}(i)$ having a larger value. Consequently, in the next step S63, the error value $\epsilon_{t,d}$ calculated using the weight $D_t(i)$ is increased.

In step S67, the identifier generating section 24 determines whether or not the variable t is the same as the number of weak learners $h_{t,d}(x_{i,d})$ (hereinafter, also referred to as the number of weak learners), T.

When it has been determined that the variable t is not the same as the number of weak learners T in step S67, the process proceeds to step S68. The identifier generating section 24 increments the variable t by 1. The process returns from step S68 to step S63. In the following, the same process is repeated.

When it has been determined that the variable t is the same as the number of weak learners T, that is, when T weak learners $h_{1,d(1)}(x_{i,d(1)})$, $h_{2,d(2)}(x_{i,d(2)})$, ..., $h_{T,d(T)}(x_{i,d(T)})$ constituting the identifier H(x) and T minimum error dimensions d(1), d(2), ..., d(T) have been generated in step S67, the process proceeds to step S69. The identifier generating section 24 outputs the T weak learners $h_{1,d(1)}(x_{i,d(1)})$, $h_{2,d(2)}(x_{i,d(2)})$, ..., $h_{T,d(T)}(x_{i,d(T)})$ and T reliability levels $\alpha_1$, $\alpha_2$, ..., $\alpha_T$ as (parameters defining) the identifier H(x).

The identifier generating section 24 outputs the T minimum error dimensions d(1), d(2), ..., d(T) as dimensional information in step S69, and then the identifier generating process is terminated.

By boosting-based statistical learning as described above, the identifier generating section 24 produces the identifier H(x) for performing identification using dimensions (minimum error dimensions) d(1) to d(T) indicating T dimensional feature quantities, which are more valid to identify an identification object, and dimensional feature quantities of the minimum error dimensions d(t).

Description of Learning Process of Learning Device

A process (learning process) to be executed by the learning device of FIG. 1 will be described with reference to FIG. 15.

In the learning device, a model image is supplied to the feature-point extracting section 11, and a generation image is supplied to the feature-point extracting section 21. A true label is supplied to the identifier generating section 24.

In the learning device, in step S81, the feature-point extracting section 11 extracts feature points from a model image supplied thereto, and supplies the feature-point feature-quantity extracting section 12 with the feature points and the model image.

In step S81, the feature-point extracting section 21 extracts the feature points from the generation image supplied thereto and supplies the feature-point feature-quantity extracting section 22 with the generation image and the feature points. The process proceeds to step S82.

In step S82, the feature-point feature-quantity extracting section 12 extracts feature-point feature-quantities of the feature points supplied by the feature-point extracting section 11 from the model image supplied by the feature-point extracting section 11 (performs the feature-point feature-quantity extracting process of FIG. 9), and supplies the feature-point feature-quantity storage section 13 with the extracted feature-point feature-quantities, so that the feature-point feature-quantities are stored in the feature-point feature-quantity storage section 13.

Furthermore, in step S82, the feature-point feature-quantity extracting section 22 extracts feature-point feature-quantities of the feature points supplied by the feature-point extracting section 21 from the generation image supplied by the feature-point extracting section 21, and supplies the total-feature-quantity generating section 23 with the extracted feature-point feature-quantities. The process proceeds to step S83.

In step S83, the total-feature-quantity generating section 23 produces a total feature quantity indicating a feature of the entire generation image from the feature-point feature-quantities of the generation image from the feature-point feature-quantity extracting section 22 on the basis of the feature-point feature-quantities of the model image stored in the feature-point feature-quantity storage section 13 (performs a total-feature-quantity generating process of FIG. 11 or 12). Furthermore, in step S83, the total-feature-quantity generating section 23 supplies the identifier generating section 24 with the total feature quantity of the generation image. The process proceeds to step S84.

In step S84, the identifier generating section 24 generates and outputs an identifier and dimensional information (performs the identifier generating process of FIG. 14) by boosting-based statistical learning using a total feature quantity of the generation image from the total-feature-quantity generating section 23 and a true label of the generation image. Then, the learning process is terminated.

Figure 15:
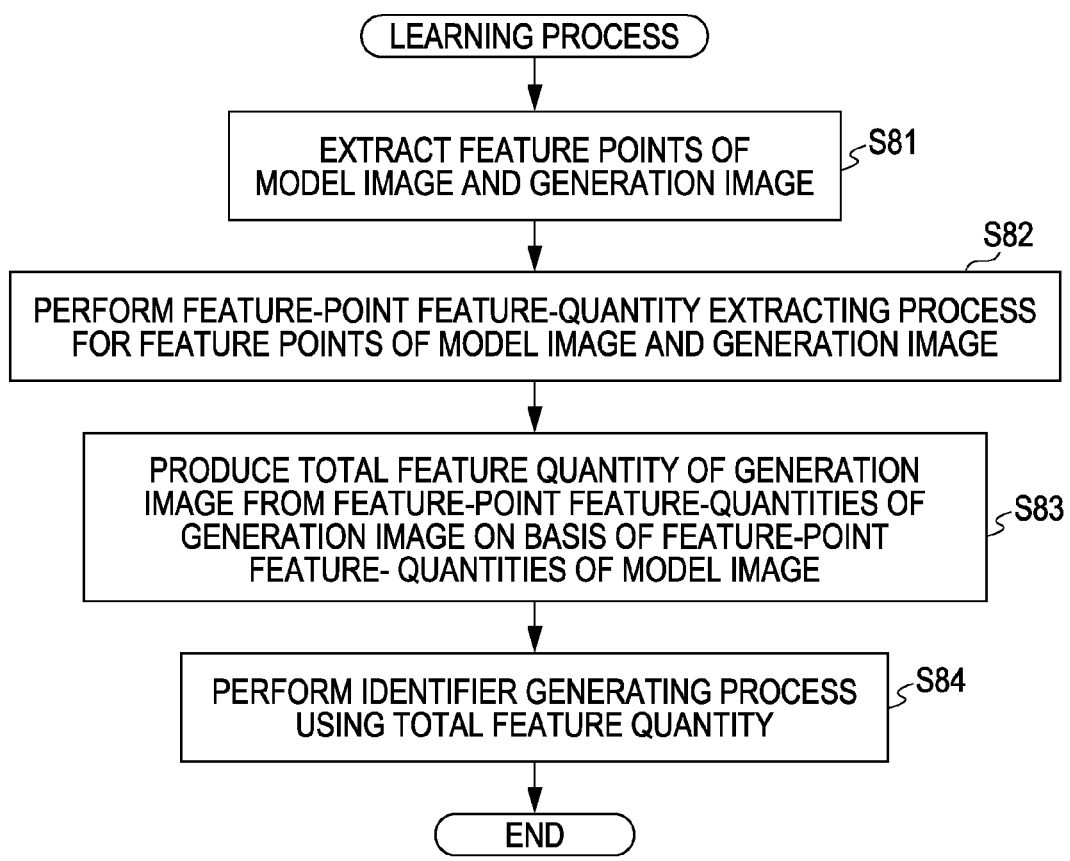
FIG. 15 is a flowchart illustrating a learning process of a learning device.

Identifiers for identifying a plurality of different identification objects and dimensional information are generated by preparing learning images (model images and generation images) and true labels for every different identification object and performing the learning process of FIG. 15.

Configuration Example of Identification Device According to Embodiment

Figure 16:
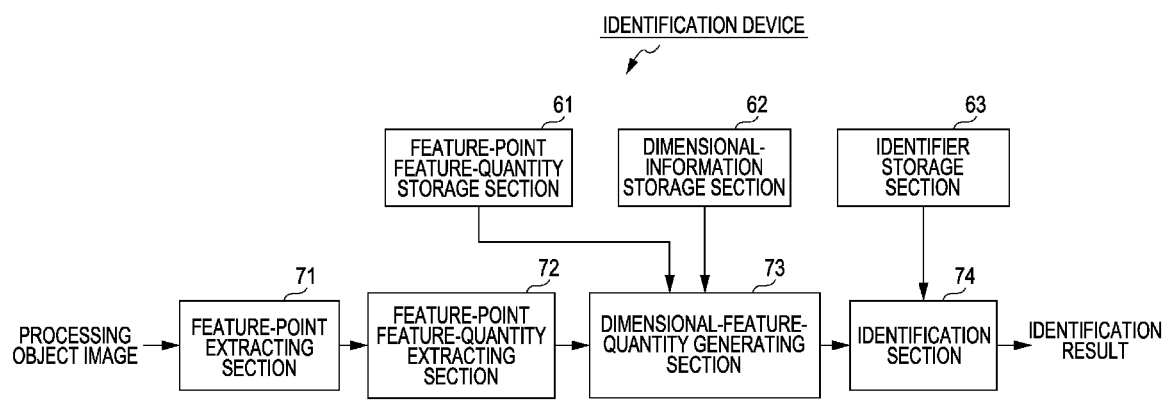
FIG. 16 is a block diagram illustrating a configuration example of an identification device according to an embodiment of the present invention.

FIG. 16 is a block diagram illustrating an identification device according to an embodiment of the present invention.

In FIG. 16, the identification device identifies whether a subject viewed in a processing object image is a predetermined identification object using an identifier H(x) and minimum error dimensions d(1) to d(T) as dimensional information obtained by the learning device of FIG. 1.

That is, the identification device includes a feature-point feature-quantity storage section 61, a dimensional-information storage section 62, an identifier storage section 63, a feature-point extracting section 71, a feature-point feature-quantity extracting section 72, a dimensional-feature-quantity generating section 73, and an identification section 74.

The feature-point feature-quantity storage section 61 stores feature-point feature-quantities of a model image obtained by the feature-point feature-quantity extracting section 12 of the learning device of FIG. 1 for a predetermined identification object (which are the same as feature-point feature-quantities stored in the feature-point feature-quantity storage section 13).

The dimensional-information storage section 62 stores minimum error dimensions d(1) to d(T) as dimensional information obtained by the identifier generating section 24 of the learning device of FIG. 1 for the predetermined identification object.

The identifier storage section 63 stores T weak learners $h_{1,d(1)}(x_{i,d(1)}), h_{2,d(2)}(x_{i,d(2)}), \ldots, h_{T,d(T)}(x_{i,d(T)})$ as an identifier H(x) obtained by the identifier generating section 24 of the learning device of FIG. 1 for the predetermined identification object and T reliability levels $\alpha_1, \alpha_2, \ldots, \alpha_T$.

A processing object image of an object for identifying whether a subject viewed in an image is the predetermined identification object is supplied to the feature-point extracting section 71. Like the feature-point extracting section 11 of FIG. 1, the feature-point extracting section 71 extracts feature points from the processing object image supplied thereto, and supplies the feature-point feature-quantity extracting section 72 with the feature points and the processing object image.

The feature-point feature-quantity extracting section 72 extracts feature-point feature-quantities of the same feature points supplied by the feature-point extracting section 71 from the processing object image supplied by the feature-point extracting section 71, and supplies the dimensional-feature-quantity generating section 73 with the feature-point feature-quantities.

Like the total-feature-quantity generating section 23 of the learning device of FIG. 1, the dimensional-feature-quantity generating section 73 produces dimensional feature quantities constituting a total feature quantity of the processing object image from the feature-point feature-quantities of the processing object image from the feature-point feature-quantity extracting section 72 on the basis of feature-point feature-quantities of the model image stored in the feature-point feature-quantity storage section 61.

In this regard, the dimensional-feature-quantity generating section 73 does not produce all M (M-dimensional) dimensional feature quantities constituting the total feature quantity of the processing object image, but selectively produces dimensional feature quantities of minimum error dimensions d(1) to d(T) as dimensional information stored in the dimensional-information storage section 62 among the M dimensional feature quantities.

The dimensional-feature-quantity generating section 73 may produce only the dimensional feature quantities of minimum error dimensions d(1) to d(T) in the total feature quantity of the processing object image from the start, or may produce the total feature quantity of the processing object image and extract the dimensional feature quantities of the minimum error dimensions d(1) to d(T) from the total feature quantities.

Here, for example, a vector having M dimensional feature quantities as components is denoted by x' as a total feature quantity of the processing object image constituted by the M dimensional feature quantities. An $m^{th}$ item of the M dimensional feature quantities of the total feature quantity x' of the processing object image is denoted by $x'_m$.

In this case, dimensional feature quantities of minimum error dimensions d(1) to d(T) among the M dimensional feature quantities of the total feature quantity x' of the processing object image are denoted by $x'_{d(1)}, x'_{d(2)}, \ldots, x'_{d(T)}$.

The dimensional-feature-quantity generating section 73 selects (selectively produces) the T dimensional feature quantities $x'_{d(1)}, x'_{d(2)}, \ldots, x'_{d(T)}$ of the minimum error dimensions d(1) to d(T) among the M dimensional feature quantities of the total feature quantity x' of the processing object image, and supplies the identification section 74 with the T dimensional feature quantities.

The identification section 74 identifies whether or not a subject viewed in the processing object image is a predetermined identification object by providing the identifier H(x') stored in the identifier storage section 63 with the dimensional feature quantities $x'_{d(1)}$ to $x'_{d(T)}$ of the minimum error dimensions d(1) to d(T) of the processing object image from the dimensional-feature-quantity generating section 73 as an input x', and outputs the identification result.

That is, the identification section 74 calculates the function H(x') of Expression (19) as the identifier H(x') using T weak learners $h_{1,d(1)}(x'_{d(1)}), h_{2,d(2)}(x'_{d(2)}), \ldots, h_{T,d(T)}(x'_{d(T)})$ as the identifier H(x') stored in the identifier storage section 63 and T reliability levels $\alpha_1, \alpha_2, \ldots, \alpha_T$.

$$H(x') = \mathrm{sign}\left(\sum_{t=1}^{T} \alpha_t h_{t,d(t)}(x'_{d(t)})\right) \qquad \text{Expression 19}$$

Here, in Expression (19), for example, sign( ) is a function of outputting +1 when the sign within the parentheses ( ) is positive, and outputting −1 when the sign within the parentheses ( ) is negative. Therefore, a value of the function H(x') of Expression (19) becomes +1 or −1.

When the value of the function H(x') of Expression (19) is +1, the identification result indicates that the subject viewed in the processing object image is the predetermined identification object. When the value of the function H(x') of Expression (19) is −1, the identification result indicates that the subject viewed in the processing object image is not the predetermined identification object.

Description of Identification Process of Identification Device

Figure 17:
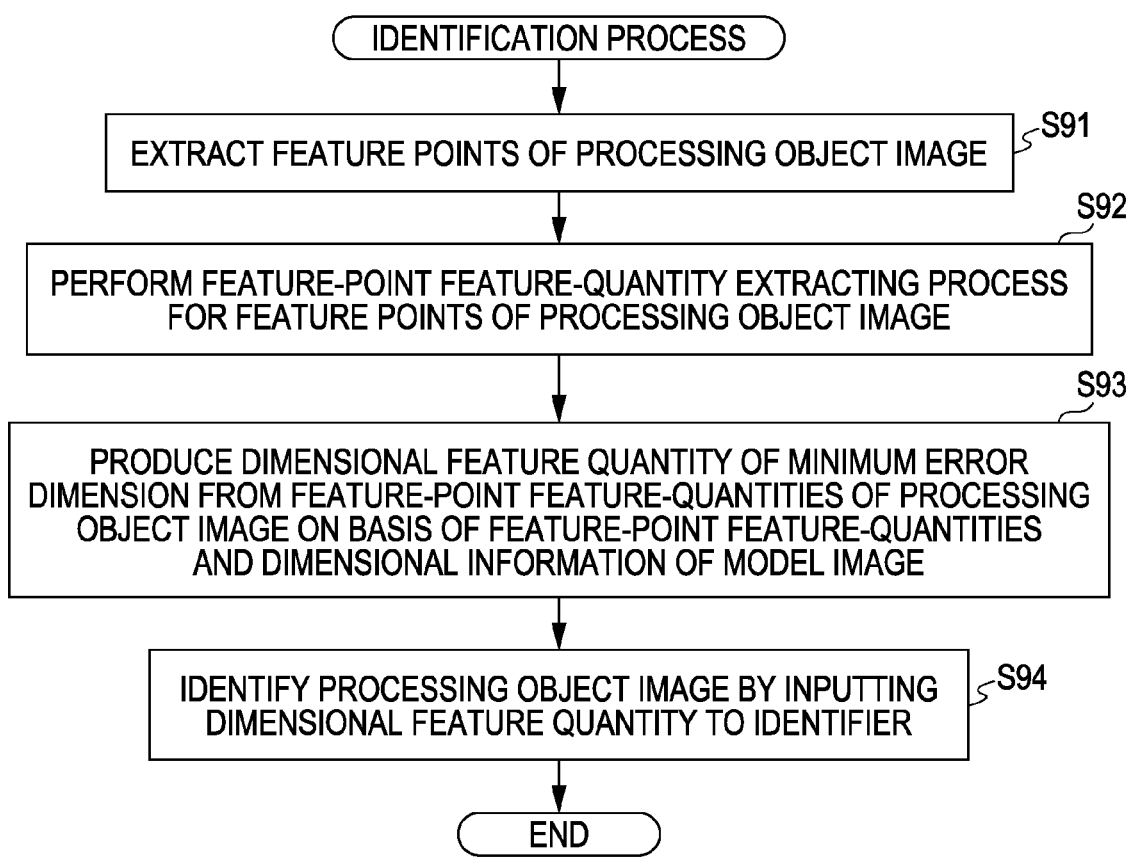
FIG. 17 is a flowchart illustrating an identification process of the identification device.

A process (identification process) to be executed by the identification device of FIG. 16 will be described with reference to FIG. 17.

In the identification device, a processing object image is supplied to the feature-point extracting section 71.

In step S91, the feature-point extracting section 71 extracts feature points from the processing object image supplied thereto, and supplies the feature-point feature-quantity extracting section 72 with the feature points and the processing object image. The process proceeds to step S92.

In step S92, the feature-point feature-quantity extracting section 72 extracts feature-point feature-quantities of the same feature points supplied by the feature-point extracting section 71 from the processing object image supplied by the feature-point extracting section 71, and supplies the dimensional-feature-quantity generating section 73 with the feature-point feature-quantities. The process proceeds to step S93.

In step S93, the dimensional-feature-quantity generating section 73 produces dimensional feature quantities $x'_{d(1)}$ to $x'_{d(T)}$ of minimum error dimensions d(1) to d(T) as dimensional information stored in the dimensional-information storage section 62 among dimensional feature quantities constituting a total feature quantity of the processing object image from the feature-point feature-quantities of the processing object image supplied by the feature-point feature-quantity extracting section 72 on the basis of feature-point feature-quantities of the model image stored in the feature-point feature-quantity storage section 61.

The dimensional-feature-quantity generating section 73 supplies the identification section 74 with the dimensional feature quantities $x'_{d(1)}$ to $x'_{d(T)}$ of the minimum error dimensions d(1) to d(T). The process proceeds from step S93 to step S94.

In step S94, the identification section 74 identifies whether or not a subject viewed in the processing object image is a predetermined identification object by applying the dimensional feature quantities $x'_{d(1)}$ to $x'_{d(T)}$ of the minimum error dimensions d(1) to d(T) of the processing object image from the dimensional-feature-quantity generating section 73 as an input x' to the identifier H(x') expressed by Expression (19) stored in the identifier storage section 63, and outputs the identification result. The identification process is terminated.

Feature-point feature-quantities produced by the feature-point feature-quantity extracting section 72 of the identification device of FIG. 16 like the feature-point feature-quantity extracting section 12 of FIG. 1 have high discrimination and invariance as described with reference to FIG. 8. The identification device can perform identification with high discrimination and invariance by identifying a processing object image using dimensional feature quantities generated from the above-described feature-point feature-quantities.

Description of Computer According to Embodiment of Present Invention

The series of processes described above may be executed by hardware or software. When the series of processes is executed by software, a program constituting the software is installed in a general-purpose computer or the like.

Figure 18:
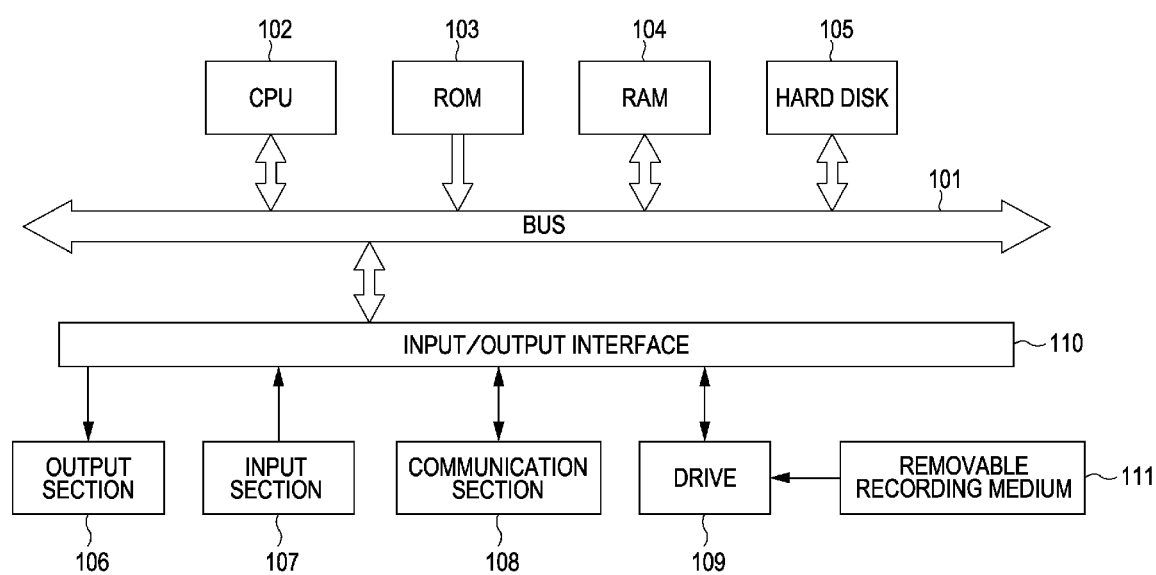
FIG. 18 is a block diagram illustrating a configuration example of a computer according to an embodiment of the present invention.

FIG. 18 illustrates a configuration example of a computer where a program for executing the series of processes described above is installed.

The program may be recorded in advance on a hard disk 105 or a Read Only Memory (ROM) 103 built in the computer and serving as a recording medium.

Alternatively, the program may be stored (recorded) on a removable recording medium 111. The removable recording medium 111 may be provided as so-called package software. For example, a flexible disk, a Compact Disc-Read Only Memory (CD-ROM), a Magneto Optical (MO) disk, a Digital Versatile Disk (DVD), a magnetic disk, or a semiconductor memory exists as the removable recording medium 111.

The program may be installed from the above-described removable recording medium 111 to the computer. The program may also be installed in the built-in hard disk 105 by downloading the program to a computer via a communication network or a broadcasting network. That is, it is possible to transmit the program wirelessly from a download site to the computer via an artificial satellite for digital satellite broadcasting or to transmit the program to the computer using a wired link via a network such as a Local Area Network (LAN) or the Internet.

The computer has a central processing section (CPU) 102 built therein. An input/output interface 110 is connected to the CPU 102 via a bus 101.

When a user inputs an instruction by manipulating an input section 107 through the input/output interface 110, the CPU 102 executes a program stored in the Read Only Memory (ROM) 103 according to the instruction. Alternatively, the CPU 102 loads a program stored in the hard disk 105 in a Random Access Memory (RAM) 104 and executes the program loaded in the RAM 104.

Thus, the CPU 102 executes a process in accordance with the flowchart described above or a process to be executed by the configuration of the above-described block diagram. Then, the CPU 102, for example, outputs the processing result from an output section 106 via the input/output interface 110 as necessary, transmits the processing result from a communication section 108, or records the processing result in the hard disk 105.

The input section 107 may include a keyboard, a mouse, and/or a microphone. The output section 106 may include a Liquid Crystal Display (LCD) section and/or a speaker.

In the present specification, the process to be executed by the computer according to the program is not necessarily executed chronologically according to the sequence noted on the flowchart. That is, the process to be executed by the computer according to the program may include a process to be executed in parallel or separately (for example, parallel processing or object processing).

The program may be processed by a single computer or may be processed by a plurality of computers in a distributed processing manner. Furthermore, the program may be transferred to and executed by a remote computer.

The present application contains subject matter related to that disclosed in Japanese Priority Patent Application JP 2009-036500 filed in the Japan Patent Office on Feb. 19, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A learning device comprising:
feature-point extracting means for extracting feature points as characteristic points from one of a plurality of generation images including a positive image in which a predetermined identification object is viewed and a negative image in which no identification object is viewed for use in learning to generate an identifier for identifying whether or not a subject viewed in an image is the identification object;

feature-point feature-quantity extracting means for extracting feature-point feature-quantities representing features of the feature points of the generation image;

total-feature-quantity generating means for generating a total feature quantity represented by a multi-dimensional vector from the feature-point feature-quantities of the generation image, wherein the total feature quantity represents a feature of the entire generation image; and identifier generating means for generating the identifier using the total feature quantity of the generation image and a true label indicating whether or not the generation image is a positive image or a negative image;

wherein the feature-point feature-quantity extracting means divides a feature-point area into a plurality of small areas by separating the feature-point area as an area having a feature point as a center in an angular direction and a distance direction on the basis of the feature point in each of a plurality of response images obtained by filtering the generation image by a plurality of filters having different characteristics, produces a statistical quantity of pixel values of a small area for each of the plurality of small areas, and sets the statistical quantity of each of the plurality of small areas obtained from each of the plurality of response images for the feature point as a feature-point feature-quantity of the feature point, and wherein the identifier generating means generates the identifier for performing identification using a dimensional feature quantity to decrease an error value representing an identification error level of the positive and negative images among a plurality of dimensional feature quantities which are components of the multi-dimensional vector as the total feature quantity, and generates dimensional information representing a dimension of the dimensional feature quantity to decrease the error value.

2. The learning device according to claim 1, wherein the feature-point feature-quantity extracting means includes:

filter means for filtering the generation image by each of derivatives based on Gaussian functions of a plurality of scales $\sigma$, a plurality of angle $\theta$ directions, and a plurality of differentiations c and outputting the plurality of response images; and feature-point feature-quantity calculating means for dividing the feature-point area into the plurality of small areas by separating the feature-point area as a circular area having the feature point as the center and having a fixed radius on the basis of the feature point in the response image obtained by filtering in a derivative based on the same scale $\sigma$, the same angle $\theta$ direction, and the same number of differentiations c, producing an average value of pixel values of the small area as the statistical quantity for each of the plurality of small areas, and producing types of feature quantities corresponding to a number of combinations of the plurality of scales $\sigma$ and the plurality of differentiations c as feature-point feature-quantities of the feature point using a vector having a component of the average value of the pixel values of the small area produced from the response image obtained by filtering in each of derivatives based on a Gaussian function of the same scale $\sigma$, a plurality of angle $\theta$ directions, and the same number of differentiations c as one type of feature quantity.

3. The learning device according to claim 2, further comprising:

second feature-point extracting means for extracting the feature points from a model image as the positive image; and second feature-point feature-quantity extracting means for extracting feature-point feature-quantities of the feature points of the model image, wherein the total-feature-quantity generating means produces a histogram of feature-point feature-quantity values of the generation image in which feature-point feature-quantity values as values of the feature-point feature-quantities of the model image are ranked, or a correlation value of the feature-point feature-quantity values of the generation image to the feature-point feature-quantity values of the model image, as the total feature quantity.

4. The learning device according to claim 2, wherein the identifier includes a plurality of weak learners, wherein the identifier generating means determines a weak learner for outputting an identification result indicating whether the generation image is the positive image or the negative image so that the error value is decreased using the total feature quantity of the generation image as an input, produces a minimum error dimension as a dimension of the dimensional feature quantity in which a minimum value of the error value of the weak learner is obtained among the plurality of dimensional feature quantities constituting the total feature quantity, and repeats a process of producing a weight of making the error value affect an error of an identification result of the generation image according to whether the identification result of the generation image by the weak learner matches the true label for every generation image a predetermined number of times, thereby generating the identifier including a predetermined number of weak learners corresponding to the predetermined number of times and the dimensional information representing the minimum error dimension corresponding to the predetermined number of weak learners, and wherein the error value is produced by adding the weight of the generation image of which the identification result is erroneous among the plurality of generation images.

5. The learning device according to claim 2, wherein the feature-point extracting means extracts a corner point as the feature point.

6. A learning method comprising the steps of:

extracting feature points as characteristic points from one of a plurality of generation images including a positive image in which a predetermined identification object is viewed and a negative image in which no identification object is viewed for use in learning to generate an identifier for identifying whether or not a subject viewed in an image is the identification object;

extracting feature-point feature-quantities representing features of the feature points of the generation image;

generating a total feature quantity represented by a multi-dimensional vector from the feature-point feature-quantities of the generation image, wherein the total feature quantity represents a feature of the entire generation image; and generating the identifier using the total feature quantity of the generation image and a true label indicating whether or not the generation image is a positive image or a negative image;

wherein the extracting step is performed by dividing a feature-point area into a plurality of small areas by separating the feature-point area as an area having a feature point as a center in an angular direction and a distance direction on the basis of the feature point in each of a plurality of response images obtained by filtering the generation image by a plurality of filters having different characteristics, producing a statistical quantity of pixel values of a small area for each of the plurality of small areas, and setting the statistical quantity of each of the plurality of small areas obtained from each of the plurality of response images for the feature point as a feature-point feature-quantity of the feature point, and wherein the generating step is performed by generating the identifier for performing identification using a dimensional feature quantity to decrease an error value representing an identification error level of the positive and negative images among a plurality of dimensional feature quantities which are components of the multi-dimensional vector as the total feature quantity, and generating dimensional information representing a dimension of the dimensional feature quantity to decrease the error value.

7. A tangibly embodied non-transitory computer-readable storage medium storing instructions that, when executed by a processor, perform a method comprising:

extracting feature points as characteristic points from one of a plurality of generation images including a positive image in which a predetermined identification object is viewed and a negative image in which no identification object is viewed for use in learning to generate an identifier for identifying whether or not a subject viewed in an image is the identification object;

extracting feature-point feature-quantities representing features of the feature points of the generation image;

producing a total feature quantity represented by a multi-dimensional vector from the feature-point feature-quantities of the generation image, wherein the total feature quantity represents a feature of the entire generation image; and generating the identifier using the total feature quantity of the generation image and a true label indicating whether or not the generation image is a positive image or a negative image;

wherein extracting the feature-point feature-quantities comprises:

dividing a feature-point area into a plurality of small areas by separating the feature-point area as an area having a feature point as a center in an angular direction and a distance direction on the basis of the feature point in each of a plurality of response images obtained by filtering the generation image by a plurality of filters having different characteristics, producing a statistical quantity of pixel values of a small area for each of the plurality of small areas, and setting the statistical quantity of each of the plurality of small areas obtained from each of the plurality of response images for the feature point as a feature-point feature-quantity of the feature point, and wherein generating the identifier comprises:

generating the identifier for performing identification using a dimensional feature quantity to decrease an error value representing an identification error level of the positive and negative images among a plurality of dimensional feature quantities which are components of the multi-dimensional vector as the total feature quantity, and generating dimensional information representing a dimension of the dimensional feature quantity to decrease the error value.

8. An identification device comprising:

feature-point extracting means for extracting feature points as characteristic points from a processing object image of an object used to identify whether or not a subject viewed in the image is a predetermined identification object;

feature-point feature-quantity extracting means for extracting feature-point feature-quantities representing features of the feature points;

dimensional-feature-quantity generating means for generating a dimensional feature quantity of a dimension represented by dimensional information among a plurality of dimensional feature quantities which are components of a vector as a total feature quantity represented by a multi-dimensional vector from the feature-point feature-quantities of the processing object image, wherein the total feature quantity represents a feature of the entire processing object image; and identification means for identifying whether or not the subject viewed in the processing object image is the predetermined identification object by inputting the dimensional feature quantity to an identifier for identifying whether or not the subject viewed in the processing object image is the predetermined identification object, wherein the feature-point feature-quantity extracting means divides a feature-point area into a plurality of small areas by separating the feature-point area as an area having a feature point as a center in an angular direction and a distance direction on the basis of the feature point in each of a plurality of response images obtained by filtering the processing object image by a plurality of filters having different characteristics, produces a statistical quantity of pixel values of a small area for each of the plurality of small areas, and sets the statistical quantity of each of the plurality of small areas obtained from each of the plurality of response images of the processing object image for the feature point as a feature-point feature-quantity of the feature point, wherein the identifier and dimensional information are obtained by extracting feature points from one of a plurality of generation images including a positive image in which a predetermined identification object is viewed and a negative image in which no identification object is viewed for use in learning to generate the identifier, extracting feature-point feature-quantities representing features of the feature points of the generation image, generating a total feature quantity of the generation image from the feature-point feature-quantities of the generation image, and generating the identifier using the total feature quantity of the generation image and a true label indicating whether or not the generation image is a positive image or a negative image, wherein the extracting is performed by dividing a feature-point area into a plurality of small areas by separating the feature-point area as an area having a feature point as a center in an angular direction and a distance direction on the basis of the feature point in each of a plurality of response images obtained by filtering the generation image by the plurality of filters, producing a statistical quantity of pixel values of a small area for each of the plurality of small areas, and setting the statistical quantity of each of the plurality of small areas obtained from each of the plurality of response images for the feature point as a feature-point feature-quantity of the feature point, and wherein the generating is performed by generating the identifier for performing identification using a dimensional feature quantity to decrease an error value representing an identification error level of the positive and negative images among a plurality of dimensional feature quantities which are components of the multi-dimensional vector as the total feature quantity, and generating dimensional information representing a dimension of the dimensional feature quantity to decrease the error value.

9. The identification device according to claim 8, wherein the feature-point feature-quantity extracting means includes:

filter means for filtering the processing object image by each of derivatives based on Gaussian functions of a plurality of scales σ, a plurality of angle θ directions, and a plurality of differentiations c and outputting the plurality of response images; and feature-point feature-quantity calculating means for dividing the feature-point area into the plurality of small areas by separating the feature-point area as a circular area having the feature point as the center and having a fixed radius on the basis of the feature point in the response image obtained by filtering in a derivative based on the same scale σ, the same angle θ direction, and the same number of differentiations c, producing an average value of pixel values of the small area as the statistical quantity for each of the plurality of small areas, and producing types of feature quantities corresponding to a number of combinations of the plurality of scales a and the plurality of differentiations c as feature-point feature-quantities of the feature point using a vector having a component of the average value of the pixel values of the small area produced from the response image obtained by filtering in each of derivatives based on a Gaussian function of the same scale σ, a plurality of angle θ directions, and the same number of differentiations c as one type of feature quantity.

10. The identification device according to claim 9, wherein the total feature quantity of the processing object image is a histogram of feature-point feature-quantity values of the processing object image in which feature-point feature-quantity values as values of the feature-point feature-quantities of a model image are ranked, or a correlation value of the feature-point feature-quantity values of the processing object image to the feature-point feature-quantity values of the model image.

11. The identification device according to claim 9, wherein the feature-point extracting means extracts a corner point as the feature point.

12. An identification method comprising the steps of:

extracting feature points as characteristic points from a processing object image of an object used to identify whether or not a subject viewed in the image is a predetermined identification object;

extracting feature-point feature-quantities representing features of the feature points;

generating a dimensional feature quantity of a dimension represented by dimensional information among a plurality of dimensional feature quantities which are components of a vector as a total feature quantity represented by a multi-dimensional vector from the feature-point feature-quantities of the processing object image, wherein the total feature quantity represents a feature of the entire processing object image; and identifying whether or not the subject viewed in the processing object image is the predetermined identification object by inputting the dimensional feature quantity to an identifier for identifying whether or not the subject viewed in the processing object image is the predetermined identification object, wherein the feature-point feature-quantity extracting step includes dividing a feature-point area into a plurality of small areas by separating the feature-point area as an area having a feature point as a center in an angular direction and a distance direction on the basis of the feature point in each of a plurality of response images obtained by filtering the processing object image by a plurality of filters having different characteristics, producing a statistical quantity of pixel values of a small area for each of the plurality of small areas, and setting the statistical quantity of each of the plurality of small areas obtained from each of the plurality of response images of the processing object image for the feature point as a feature-point feature-quantity of the feature point, wherein the identifier and dimensional information are obtained by extracting feature points from one of a plurality of generation images including a positive image in which a predetermined identification object is viewed and a negative image in which no identification object is viewed for use in learning to generate the identifier, extracting feature-point feature-quantities representing features of the feature points of the generation image, generating a total feature quantity of the generation image from the feature-point feature-quantities of the generation image, and generating the identifier using the total feature quantity of the generation image and a true label indicating whether or not the generation image is a positive image or a negative image, wherein the extracting is performed by dividing a feature-point area into a plurality of small areas by separating the feature-point area as an area having a feature point as a center in an angular direction and a distance direction on the basis of the feature point in each of a plurality of response images obtained by filtering the generation image by the plurality of filters, producing a statistical quantity of pixel values of a small area for each of the plurality of small areas, and setting the statistical quantity of each of the plurality of small areas obtained from each of the plurality of response images for the feature point as a feature-point feature-quantity of the feature point, and wherein the generating is performed by generating the identifier for performing identification using a dimensional feature quantity to decrease an error value representing an identification error level of the positive and negative images among a plurality of dimensional feature quantities which are components of the multi-dimensional vector as the total feature quantity, and generating dimensional information representing a dimension of the dimensional feature quantity to decrease the error value.

13. A tangibly embodied non-transitory computer-readable storage medium storing instructions that, when executed by a processor, perform a method comprising:

extracting feature points as characteristic points from a processing object image of an object used to identify whether or not a subject viewed in the image is a predetermined identification object;

extracting feature-point feature-quantities representing features of the feature points;

generating a dimensional feature quantity of a dimension represented by dimensional information among a plurality of dimensional feature quantities which are components of a vector as a total feature quantity represented by a multi-dimensional vector from the feature-point feature-quantities of the processing object image, wherein the total feature quantity represents a feature of the entire processing object image; and identifying whether or not the subject viewed in the processing object image is the predetermined identification object by inputting the dimensional feature quantity to an identifier for identifying whether or not the subject viewed in the processing object image is the predetermined identification object, wherein extracting the feature-point feature-quantities comprises:

dividing a feature-point area into a plurality of small areas by separating the feature-point area as an area having a feature point as a center in an angular direction and a distance direction on the basis of the feature point in each of a plurality of response images obtained by filtering the processing object image by a plurality of filters having different characteristics, producing a statistical quantity of pixel values of a small area for each of the plurality of small areas, and setting the statistical quantity of each of the plurality of small areas obtained from each of the plurality of response images of the processing object image for the feature point as a feature-point feature-quantity of the feature point, wherein the identifier and dimensional information are obtained by extracting feature points from one of a plurality of generation images including a positive image in which a predetermined identification object is viewed and a negative image in which no identification object is viewed for use in learning to generate the identifier, extracting feature-point feature-quantities representing features of the feature points of the generation image, generating a total feature quantity of the generation image from the feature-point feature-quantities of the generation image, and generating the identifier using the total feature quantity of the generation image and a true label indicating whether or not the generation image is a positive image or a negative image, wherein the extracting is performed by:

dividing a feature-point area into a plurality of small areas by separating the feature-point area as an area having a feature point as a center in an angular direction and a distance direction on the basis of the feature point in each of a plurality of response images obtained by filtering the generation image by the plurality of filters, producing a statistical quantity of pixel values of a small area for each of the plurality of small areas, and setting the statistical quantity of each of the plurality of small areas obtained from each of the plurality of response images for the feature point as a feature-point feature-quantity of the feature point, and wherein the generating is performed by:

generating the identifier for performing identification using a dimensional feature quantity to decrease an error value representing an identification error level of the positive and negative images among a plurality of dimensional feature quantities which are components of the multi-dimensional vector as the total feature quantity, and generating dimensional information representing a dimension of the dimensional feature quantity to decrease the error value.

14. A learning device comprising:

a feature-point extracting section extracting feature points as characteristic points from one of a plurality of generation images including a positive image in which a predetermined identification object is viewed and a negative image in which no identification object is viewed for use in learning to generate an identifier for identifying whether or not a subject viewed in an image is the identification object;

a feature-point feature-quantity extracting section extracting feature-point feature-quantities representing features of the feature points of the generation image;

a total-feature-quantity generating section generating a total feature quantity represented by a multi-dimensional vector from the feature-point feature-quantities of the generation image, wherein the total feature quantity represents a feature of the entire generation image; and an identifier generating section generating the identifier using the total feature quantity of the generation image and a true label indicating whether or not the generation image is a positive image or a negative image;

wherein the feature-point feature-quantity extracting section divides a feature-point area into a plurality of small areas by separating the feature-point area as an area having a feature point as a center in an angular direction and a distance direction on the basis of the feature point in each of a plurality of response images obtained by filtering the generation image by a plurality of filters having different characteristics, produces a statistical quantity of pixel values of a small area for each of the plurality of small areas, and sets the statistical quantity of each of the plurality of small areas obtained from each of the plurality of response images for the feature point as a feature-point feature-quantity of the feature point, and wherein the identifier generating section generates the identifier for performing identification using a dimensional feature quantity to decrease an error value representing an identification error level of the positive and negative images among a plurality of dimensional feature quantities which are components of the multi-dimensional vector as the total feature quantity, and generates dimensional information representing a dimension of the dimensional feature quantity to decrease the error value.

15. An identification device comprising:

a feature-point extracting section extracting feature points as characteristic points from a processing object image of an object used to identify whether or not a subject viewed in the image is a predetermined identification object;

a feature-point feature-quantity extracting section extracting feature-point feature-quantities representing features of the feature points;

a dimensional-feature-quantity generating section generating a dimensional feature quantity of a dimension represented by dimensional information among a plurality of dimensional feature quantities which are components of a vector as a total feature quantity represented by a multi-dimensional vector from the feature-point feature-quantities of the processing object image, wherein the total feature quantity represents a feature of the entire processing object image; and an identification section identifying whether or not the subject viewed in the processing object image is the predetermined identification object by inputting the dimensional feature quantity to an identifier for identifying whether or not the subject viewed in the processing object image is the predetermined identification object, wherein the feature-point feature-quantity extracting section divides a feature-point area into a plurality of small areas by separating the feature-point area as an area having a feature point as a center in an angular direction and a distance direction on the basis of the feature point in each of a plurality of response images obtained by filtering the processing object image by a plurality of filters having different characteristics, produces a statistical quantity of pixel values of a small area for each of the plurality of small areas, and sets the statistical quantity of each of the plurality of small areas obtained from each of the plurality of response images of the processing object image for the feature point as a feature-point feature-quantity of the feature point, wherein the identifier and dimensional information are obtained by extracting feature points from one of a plurality of generation images including a positive image in which a predetermined identification object is viewed and a negative image in which no identification object is viewed for use in learning to generate the identifier, extracting feature-point feature-quantities representing features of the feature points of the generation image, generating a total feature quantity of the generation image from the feature-point feature-quantities of the generation image, and generating the identifier using the total feature quantity of the generation image and a true label indicating whether or not the generation image is a positive image or a negative image, wherein the extracting is performed by dividing a feature-point area into a plurality of small areas by separating the feature-point area as an area having a feature point as a center in an angular direction and a distance direction on the basis of the feature point in each of a plurality of response images obtained by filtering the generation image by the plurality of filters, producing a statistical quantity of pixel values of a small area for each of the plurality of small areas, and setting the statistical quantity of each of the plurality of small areas obtained from each of the plurality of response images for the feature point as a feature-point feature-quantity of the feature point, and wherein the generating is performed by generating the identifier for performing identification using a dimensional feature quantity to decrease an error value representing an identification error level of the positive and negative images among a plurality of dimensional feature quantities which are components of the multi-dimensional vector as the total feature quantity, and generating dimensional information representing a dimension of the dimensional feature quantity to decrease the error value.

\* \* \* \* \*